(12) United States Patent  
Saito

(10) Patent No.: US 8,243,320 B2  
(45) Date of Patent: Aug. 14, 2012

(54) DOCUMENT MANAGEMENT APPARATUS, CONTROL METHOD THEREFOR, COMPUTER PROGRAM, AND STORAGE MEDIUM

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1360 days.

(21) Appl. No.: 11/376,235

(22) Filed: Mar. 16, 2006

(65) Prior Publication Data

US 2006/0209351 A1    Sep. 21, 2006

(30) Foreign Application Priority Data

Mar. 18, 2005    (JP) .................................. 2005-080589

(51) Int. Cl.
*G06K 15/00* (2006.01)
*H04N 1/40* (2006.01)
*G06F 17/00* (2006.01)
*G06F 17/20* (2006.01)
*G06F 17/21* (2006.01)

(52) U.S. Cl. ...... 358/1.18; 358/3.28; 715/229; 715/230; 715/248

(58) Field of Classification Search ................. 358/1.18, 358/3.28; 715/229, 230, 248
See application file for complete search history.

(56) References Cited

U.S. PATENT DOCUMENTS

| 7,197,644 B2 * | 3/2007 | Brewington .................. 713/176 |
| 7,475,336 B2 * | 1/2009 | Fujiwara ....................... 715/230 |
| 2004/0078749 A1 * | 4/2004 | Hull et al. ..................... 715/500 |
| 2004/0141200 A1 | 7/2004 | Minami et al. ............... 358/1.15 |
| 2006/0085477 A1 * | 4/2006 | Phillips et al. ............. 707/104.1 |

FOREIGN PATENT DOCUMENTS

| JP | 10-198687 | 7/1998 |
| JP | 2004-098307 | 4/2004 |
| JP | 2004-181861 | 7/2004 |
| JP | 2004-222085 | 8/2004 |
| JP | 2004-265247 | 9/2004 |
| JP | 2004-280227 | 10/2004 |

* cited by examiner

*Primary Examiner* — King Poon
*Assistant Examiner* — Neil R McLean
(74) *Attorney, Agent, or Firm* — Fitzpatrick, Cella, Harper & Scinto

(57) ABSTRACT

A document management apparatus includes an electronic document editing unit which performs processing associated with creation and edit of an electronic document, a processing information obtaining unit which obtains processing information in the electronic document editing unit, a restriction information acceptance unit which accepts input of restriction information that restricts processing for the electronic document, and a uniformed electronic document creation unit which creates a uniformed electronic document by attaching generation information containing the processing information and the restriction information to the electronic document.

11 Claims, 32 Drawing Sheets

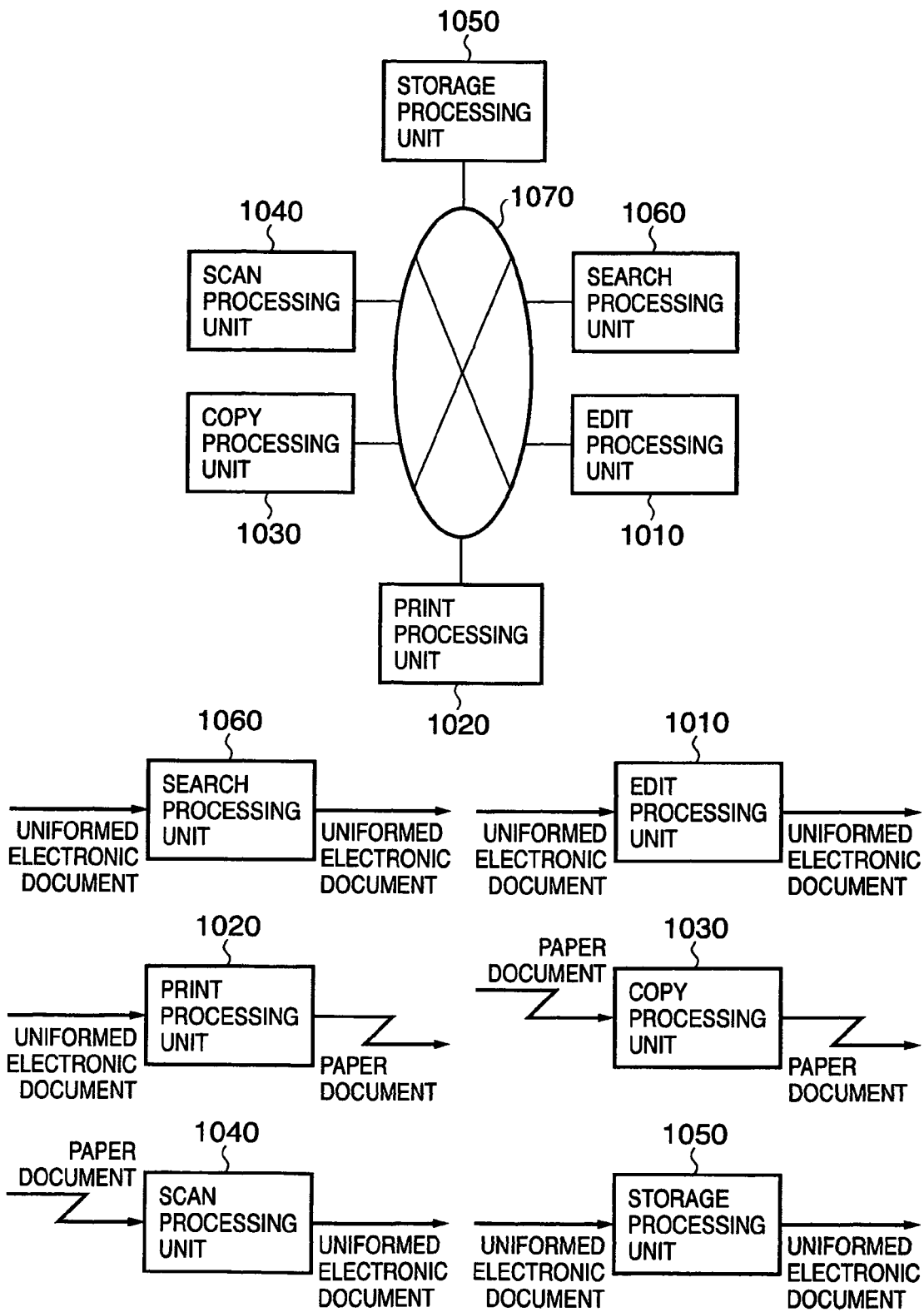

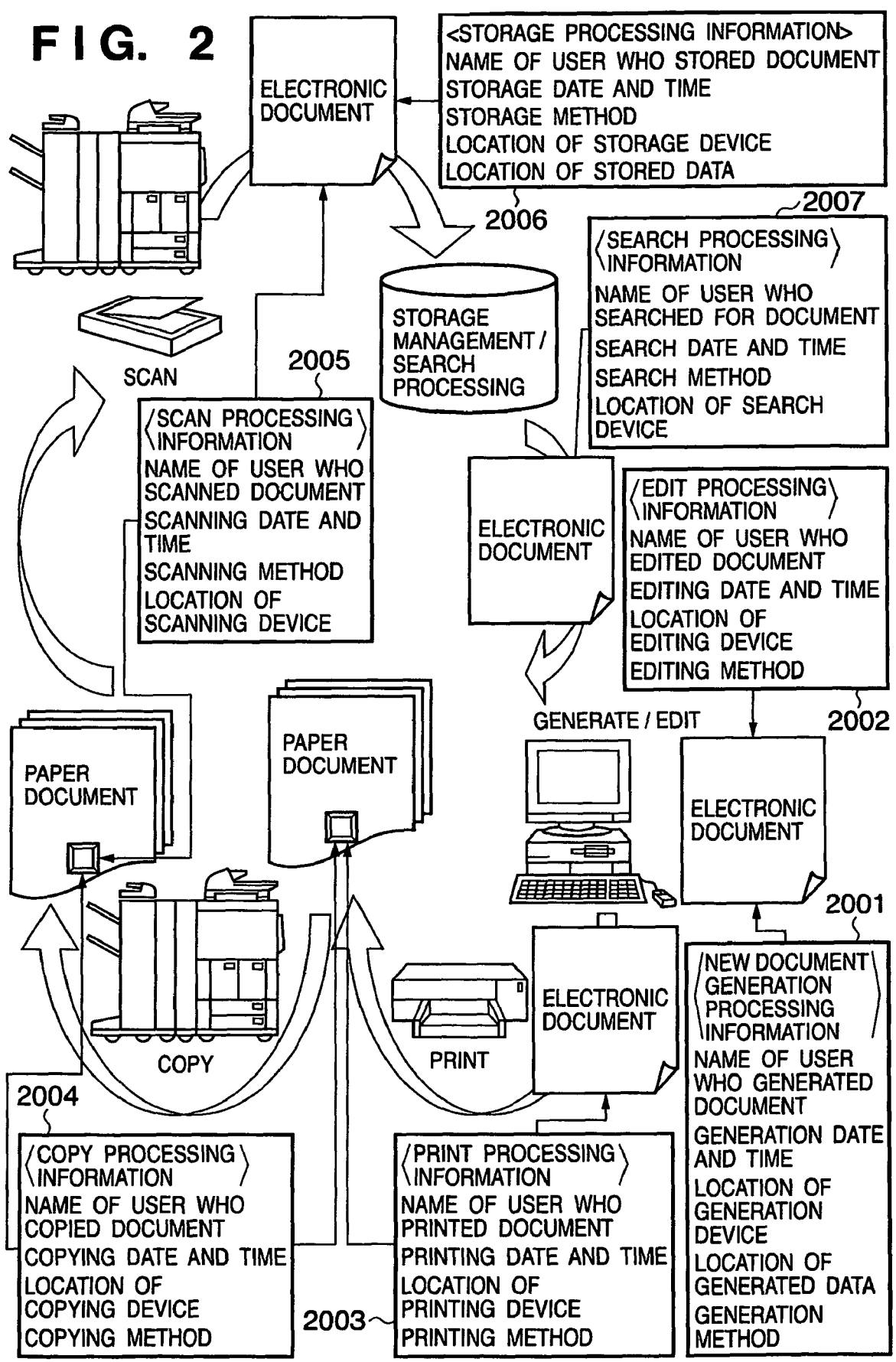

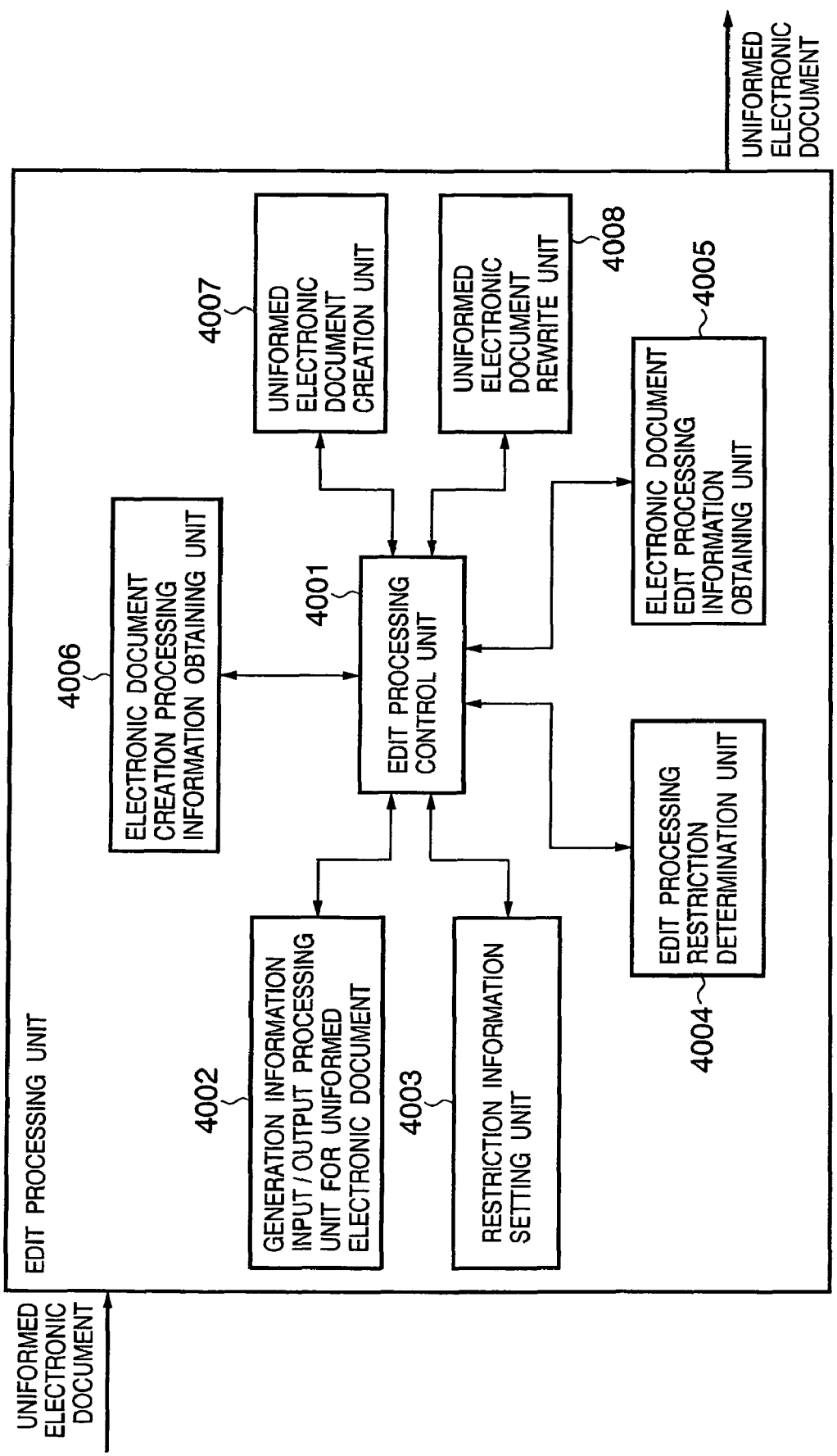

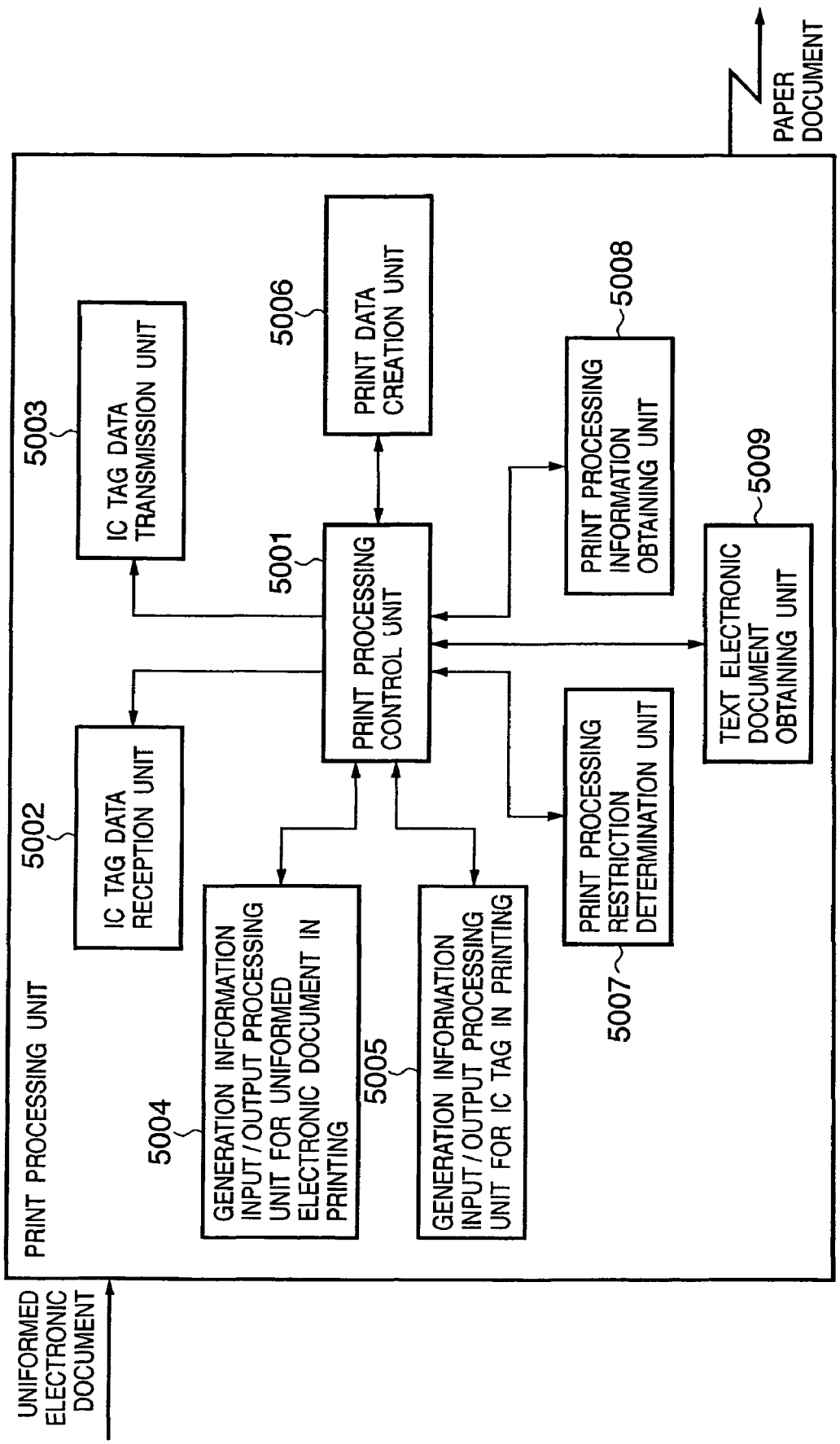

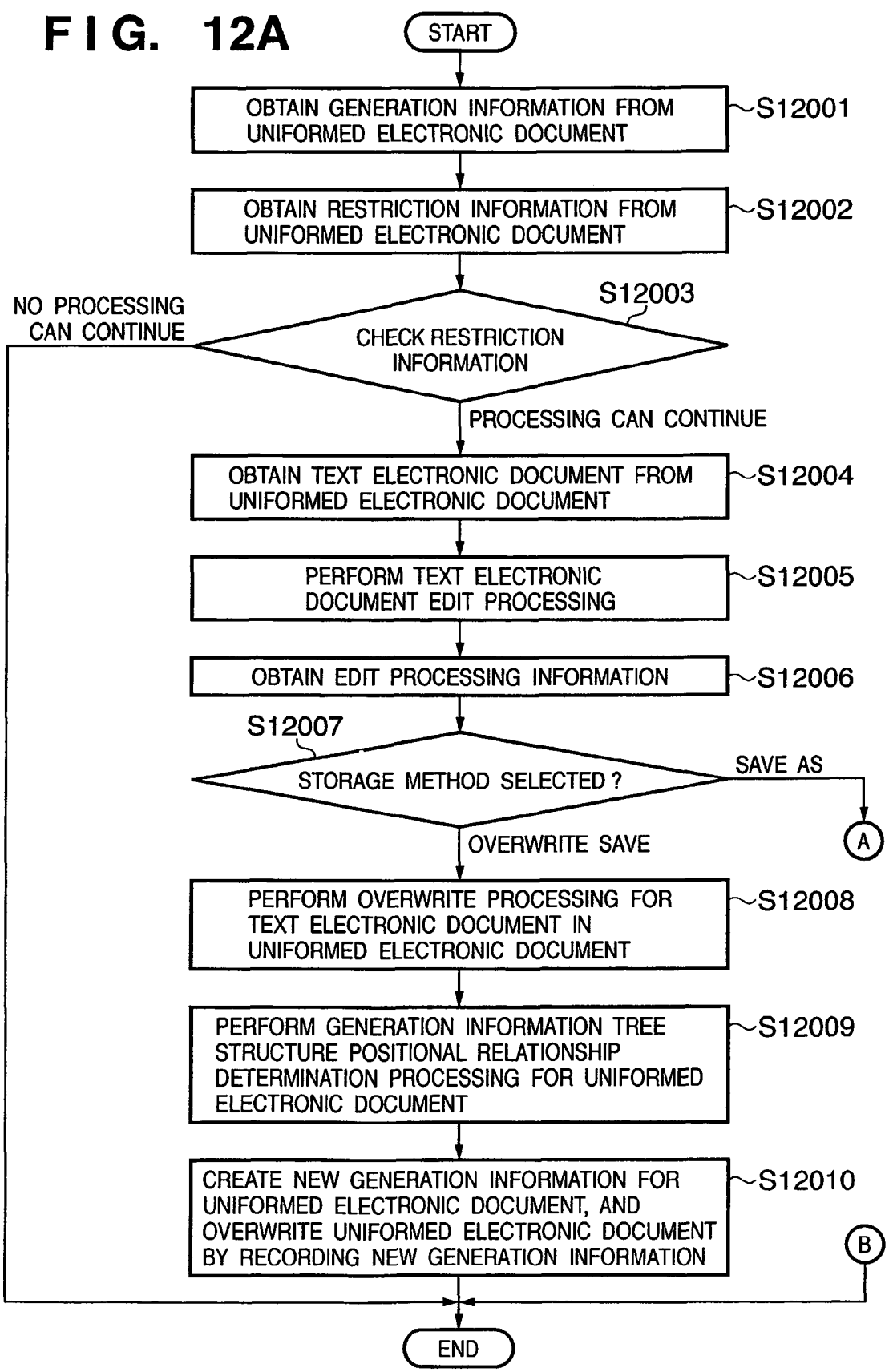

FIG. 22

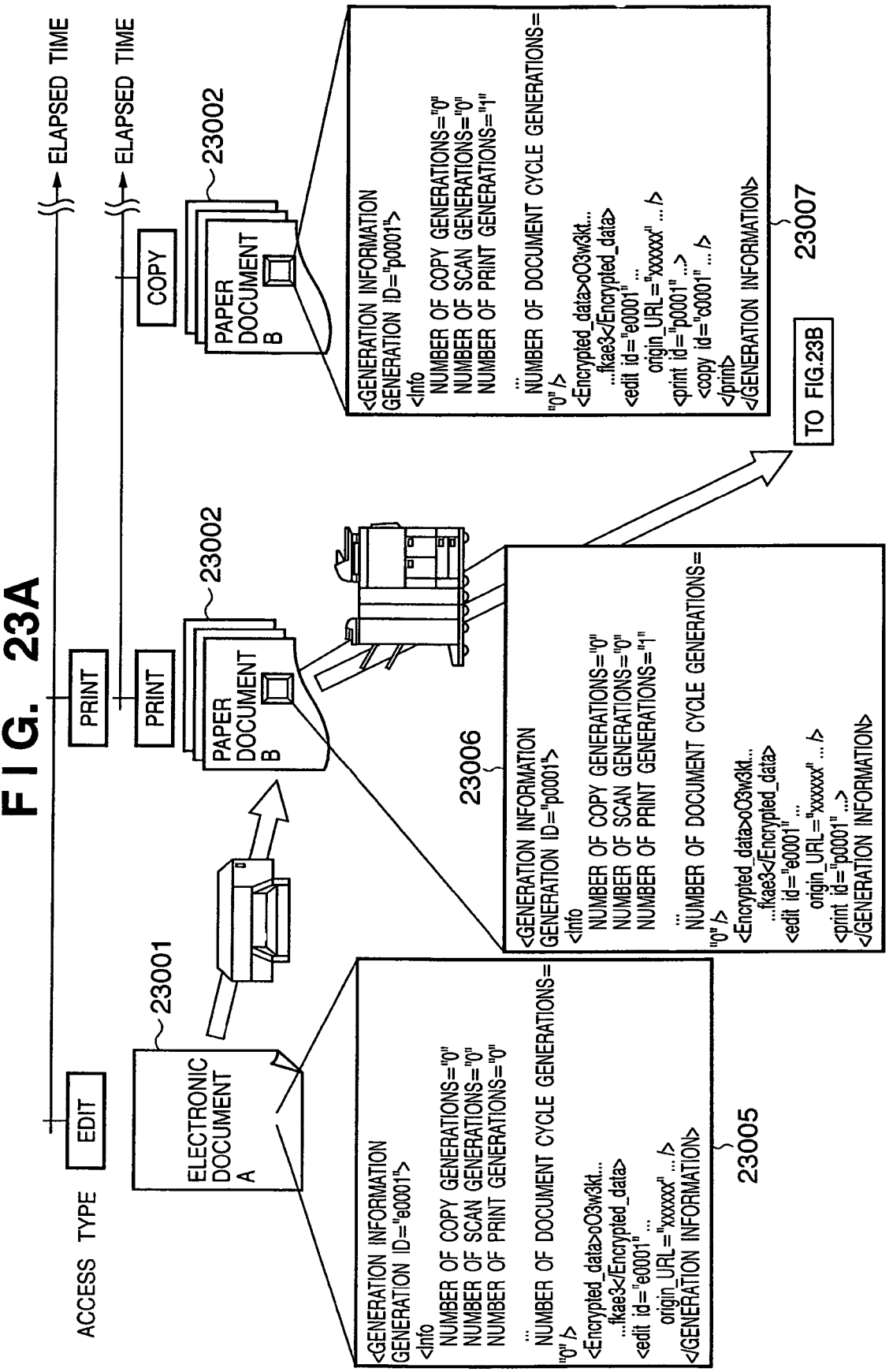

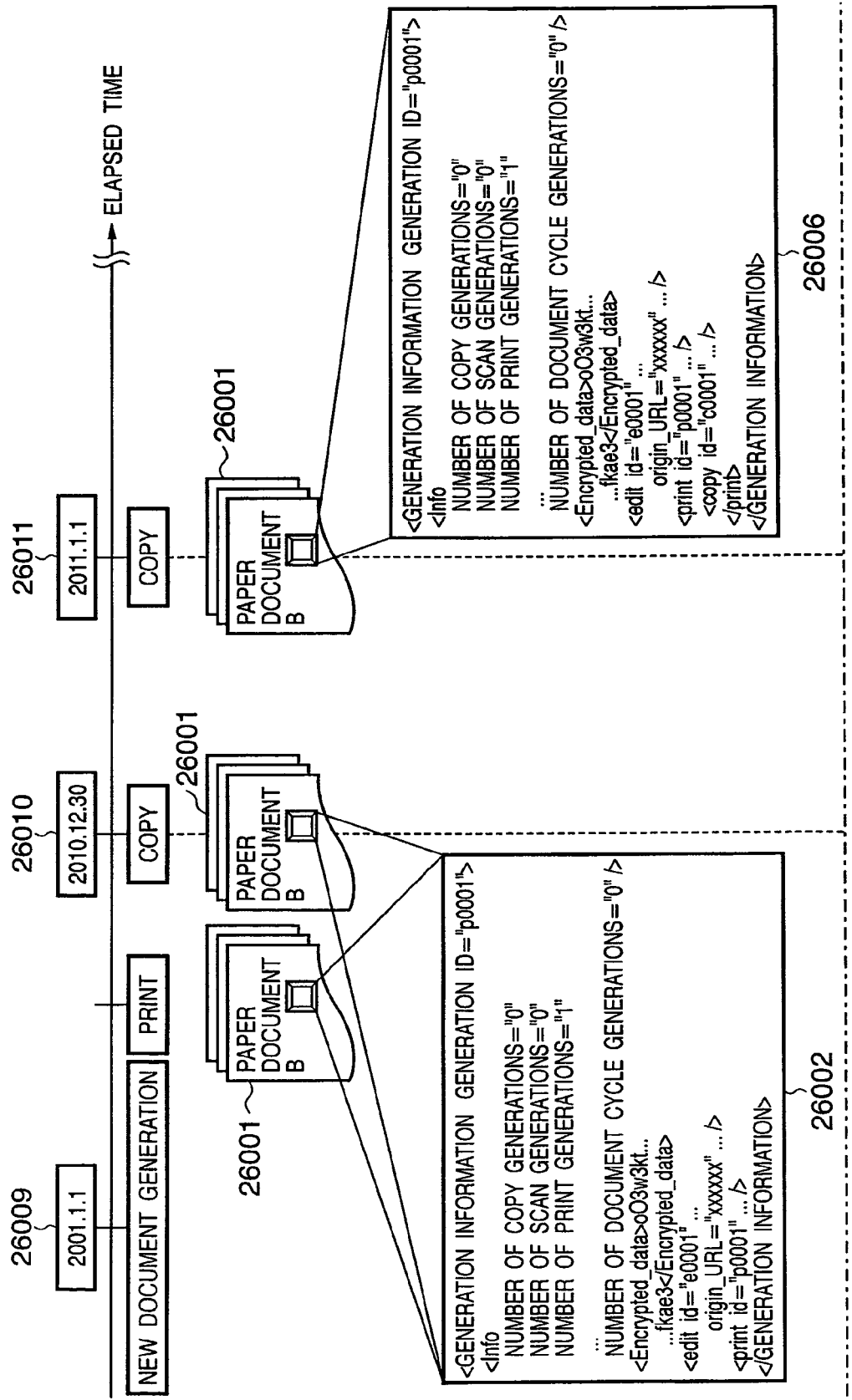

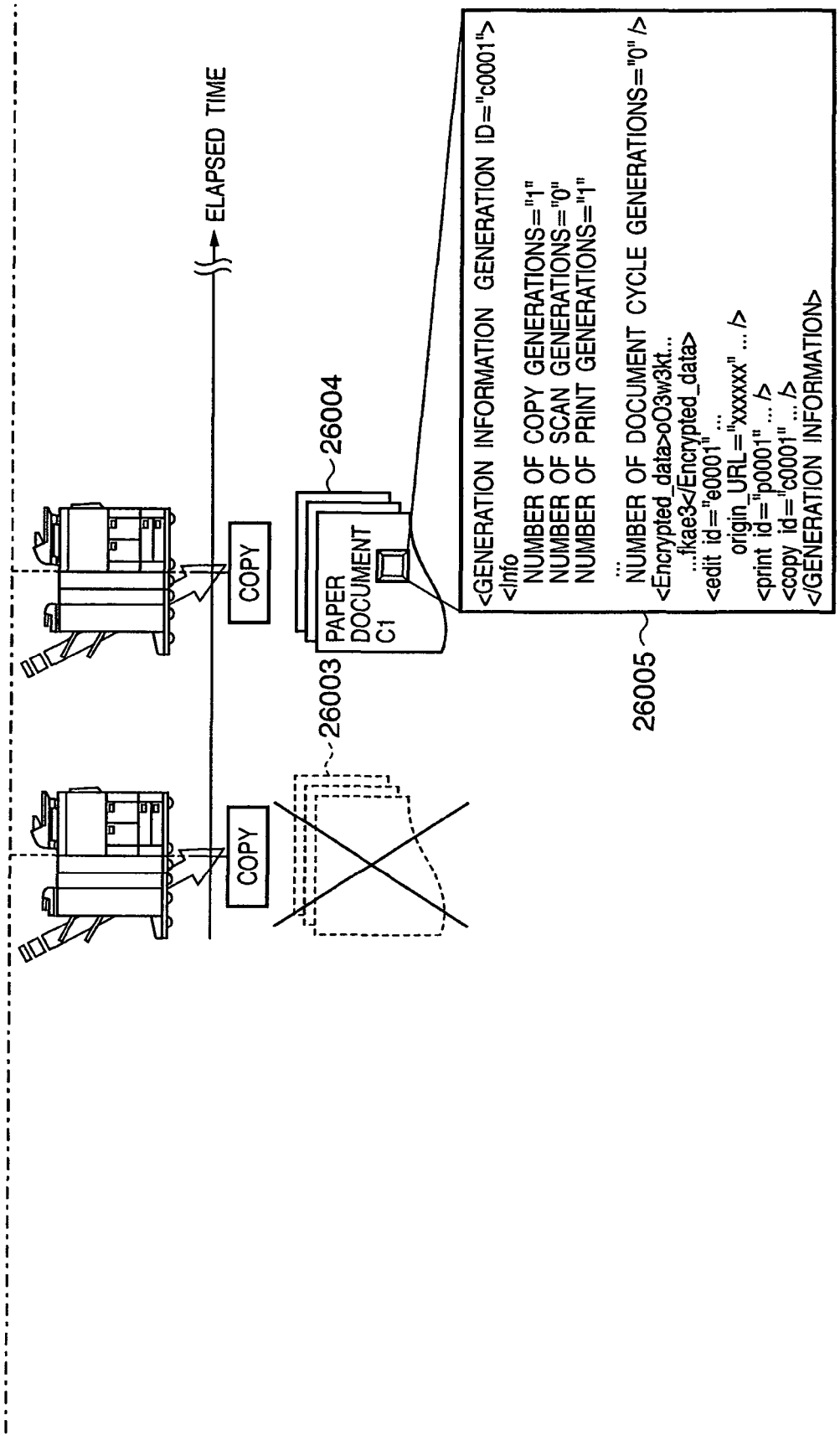

DOCUMENT MANAGEMENT APPARATUS, CONTROL METHOD THEREFOR, COMPUTER PROGRAM, AND STORAGE MEDIUM

FIELD OF THE INVENTION

The present invention relates to a document management apparatus, control method therefor, computer program, and storage medium.

BACKGROUND OF THE INVENTION

As a conventional-management method when an electronic document is printed into a paper document, barcode data for identifying a document is added to each document in advance, and management information for operation management is stored in a server in correspondence with the barcode data. In this case, every time operation is done for a given document, the document can be specified on the basis of barcode data, and management information of the document can be changed or added in accordance with the operation of the document (see Japanese Patent Laid-Open No. 10-198687).

In some cases, a serial number is encoded, and utilized as a trace unique to a user who has accessed the document when another user has a copy of the document (see Japanese Patent Laid-Open No. 2004-280227).

In order to manage a larger amount of data, there are proposed a larger number of methods of embedding an IC tag in a paper document sheet, and wirelessly reading and writing data (see Japanese Patent Laid-Open Nos. 2004-265247, 2004-181861, 2004-098307, 2004-222085, and 2004-280227). For example, only a paper sheet in which an IC tag is embedded at a predetermined location is limited and printed as a printing medium. A unique ID (e.g., a serial number) and printable level information are added to the IC tag, and can be used for the trace of the printed paper document. Also, the printer system can check the level in printing and reject printing in accordance with the level (see Japanese Patent Laid-Open No. 2004-280227).

However, in the prior arts, generation information when the document lifecycle changes (a lifecycle of an electronic document ⇒a paper document ⇒an electronic document ⇒a paper document ⇒..., more specifically, a lifecycle of edit (create) ⇒print ⇒copy ⇒scan ⇒store ⇒search⇒ edit ⇒print ⇒...) is not continuously accumulated or managed in respective documents themselves, e.g., from an electronic document to a paper document and from a paper document to an electronic document. The generation information contains <1> How many times was a document scanned, printed, or copied until the current document is obtained, or how many copies/printouts of the document were made?

<2> By whom and when a target document was accessed?

For this reason, the following problems occur.

(1) As the document lifecycle changes, a user who created the original becomes unknown.

(2) As the document lifecycle changes, it becomes difficult to grasp who accessed (edited, printed, copied, scanned, or searched for) the document (i.e., it becomes difficult to manage the spread of information of the contents).

(3) If a document in which the location of an original electronic document is written as a digital watermark or barcode on a page is copied electrophotographically, the original electronic document can be accessed even from the copy, and can be printed without any restriction and any degradation of the image quality. It is difficult to restrict access to the original electronic document on the basis of the "generation" of the document.

As described above, according to the prior arts, no document lifecycle can be effectively managed, and neither processing nor access can be managed on the basis of the document lifecycle.

SUMMARY OF THE INVENTION

According to the present invention, for example, a document management apparatus comprises an electronic document editing unit which performs processing associated with creation and edit of an electronic document, a processing information obtaining unit which obtains processing information in the electronic document editing unit, a restriction information acceptance unit which accepts input of restriction information that restricts processing for the electronic document, and a uniformed electronic document creation unit which creates a uniformed electronic document by attaching generation information containing the processing information and the restriction information to the electronic document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a schematic view showing an example of a system configuration representing the whole configuration of a document management system according to an embodiment of the present invention, and combinations of typical input and output data of each processing unit block;

FIG. 2 is a schematic view showing an example of various types of processing information which are obtained and added along with transition in processing units according to the embodiment of the present invention;

FIG. 4 is a block diagram corresponding to an example of a module configuration in an edit processing unit according to the embodiment of the present invention;

FIG. 5 is a block diagram corresponding to an example of a module configuration in a print processing unit according to the embodiment of the present invention;

FIG. 12A is a flowchart corresponding to an example of existing uniformed electronic document edit processing according to the embodiment of the present invention;

FIG. 22 is a schematic view corresponding to an example of a GUI for restriction information setting processing when a uniformed electronic document of the first generation is created according to the embodiment of the present invention;

FIGS. 23A and 23B are schematic views corresponding to examples of the structure of generation information and a change of the generation information before and after processing according to the embodiment of the present invention;

FIGS. 26A and 26B are schematic views showing examples of management on the basis of the generation management expiration date according to the third embodiment of the present invention.

DETAILED DESCRIPTION OF THE PREFERRED EMBODIMENTS

Figure 3A:
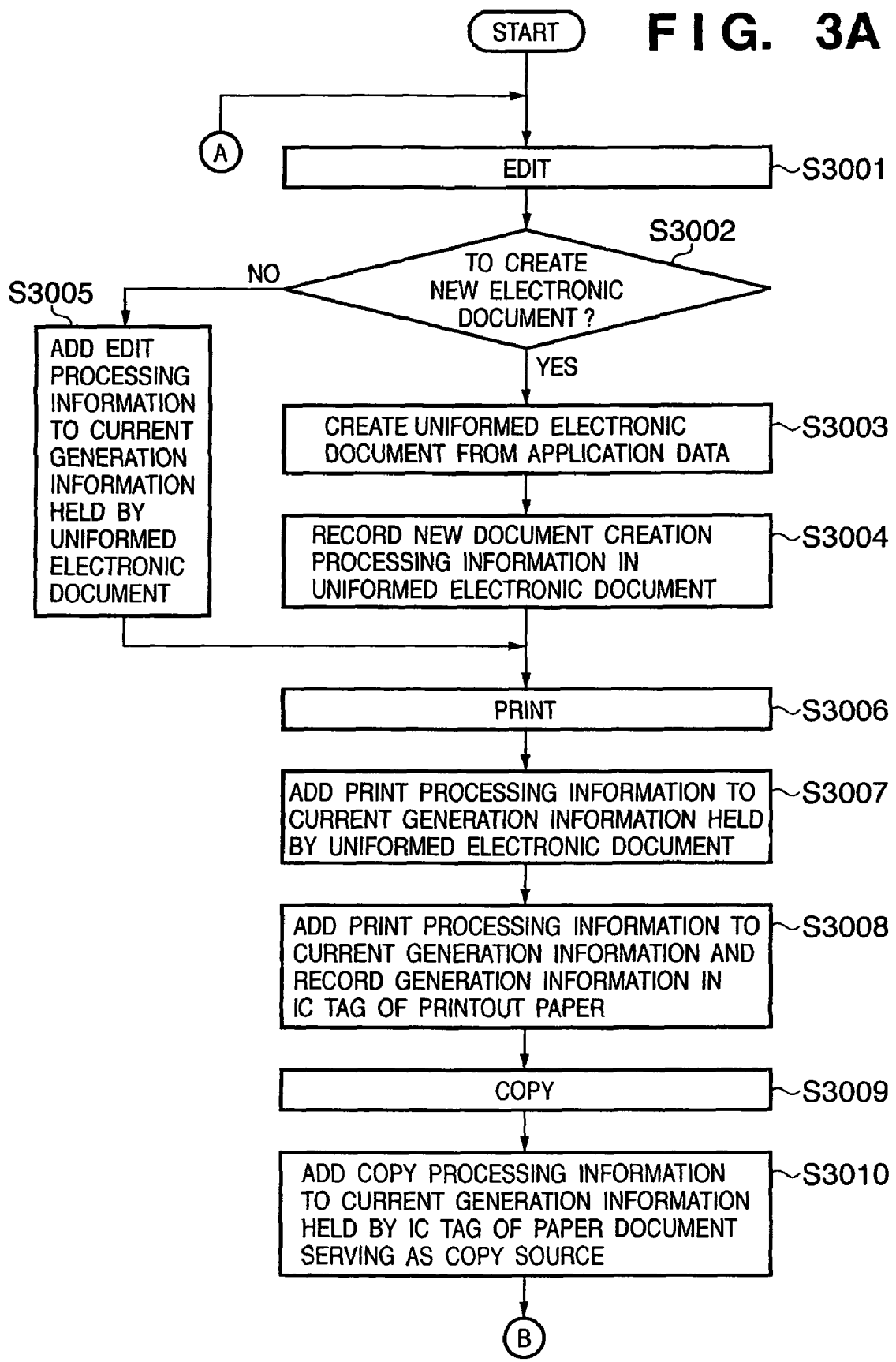
FIG. 3A is a flowchart showing an example of the flow of processing according to the embodiment of the present invention.
Figure 3B:
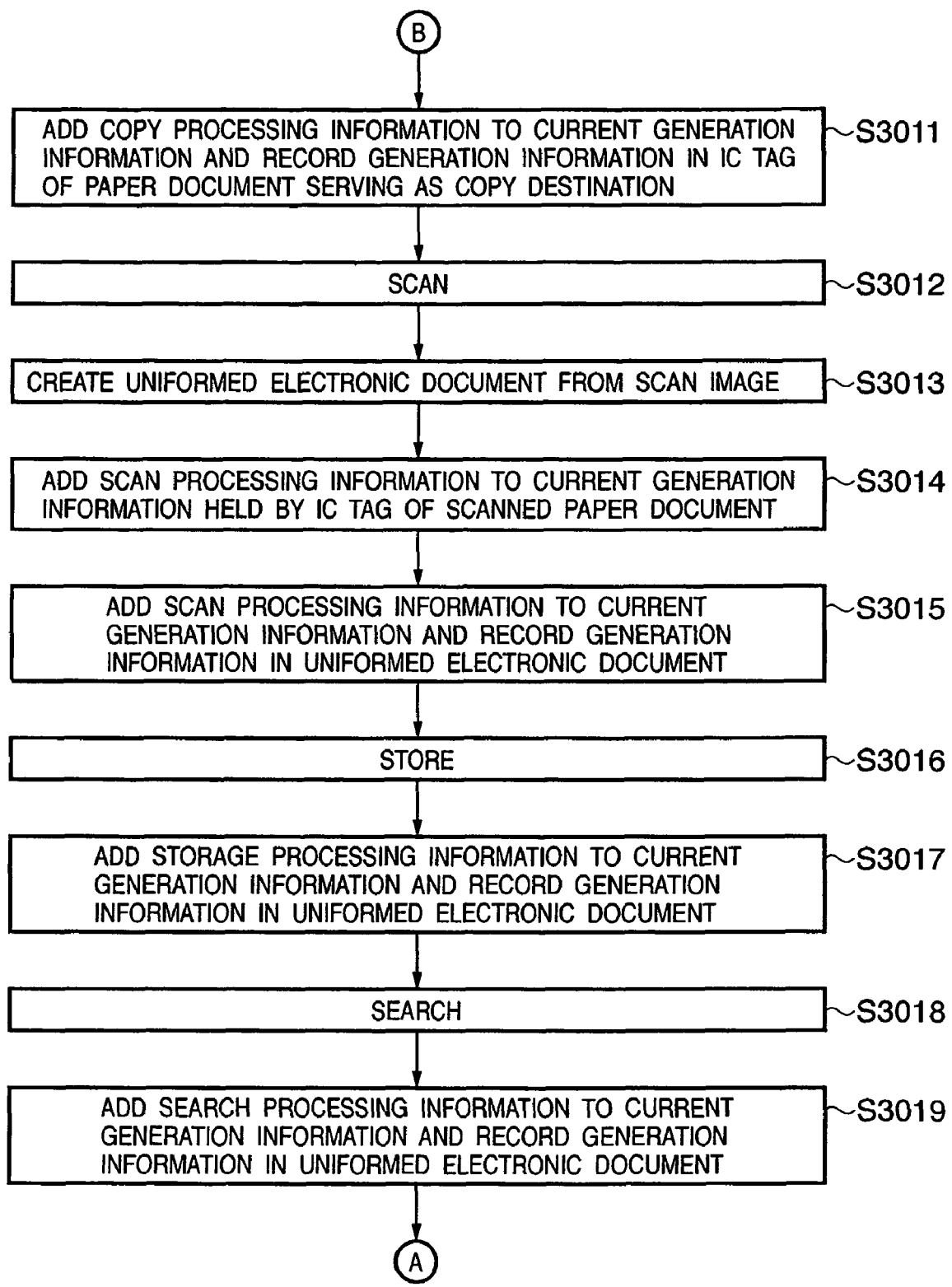
FIG. 3B is a flowchart showing an example of the flow of processing according to the embodiment of the present invention.

Preferred embodiments of the present invention will now be described in detail in accordance with the accompanying drawings.

[First Embodiment]

FIG. 1 is a schematic view showing system configuration blocks representing the whole configuration of a document management system according to the first embodiment, and a combination of typical input and output data of each processing unit block.

In FIG. 1, reference numeral 1010 denotes an edit processing unit which creates a new text electronic document, edit processing, and the like by an application such as word processing software in a personal computer or the like. The edit processing unit 1010 receives a uniformed electronic document, and outputs a uniformed electronic document. Reference numeral 1020 denotes a print processing unit which performs print processing in a combination of apparatuses such as a personal computer and printer, and inputs/outputs data to/from an IC tag embedded in a paper document. The print processing unit 1020 such as a printing apparatus receives a uniformed electronic document, and outputs a paper document. Reference numeral 1030 denotes a copy processing unit which electrophotographically copies a paper document in an apparatus such as a copying machine, and inputs/outputs data to/from an IC tag embedded in a paper document. The copy processing unit 1030 receives a paper document, and outputs a paper document.

Reference numeral 1040 denotes a scan processing unit which optically scans a paper document in an image reading apparatus such as a scanner, and inputs/outputs data to/from an IC tag embedded in a paper document. The scan processing unit 1040 receives a paper document, and outputs a uniformed electronic document. Reference numeral 1050 denotes a storage processing unit which performs storage processing in a combination of an application and apparatuses such as a personal computer and database. The storage processing unit 1050 receives a uniformed electronic document, and outputs a uniformed electronic document. Reference numeral 1060 denotes a search processing unit which performs search processing in a combination of an application and apparatuses such as a personal computer and database. The search processing unit 1060 receives a uniformed electronic document, and outputs a uniformed electronic document. Reference numeral 1070 denotes a network such as a LAN or the Internet.

Figure 27:
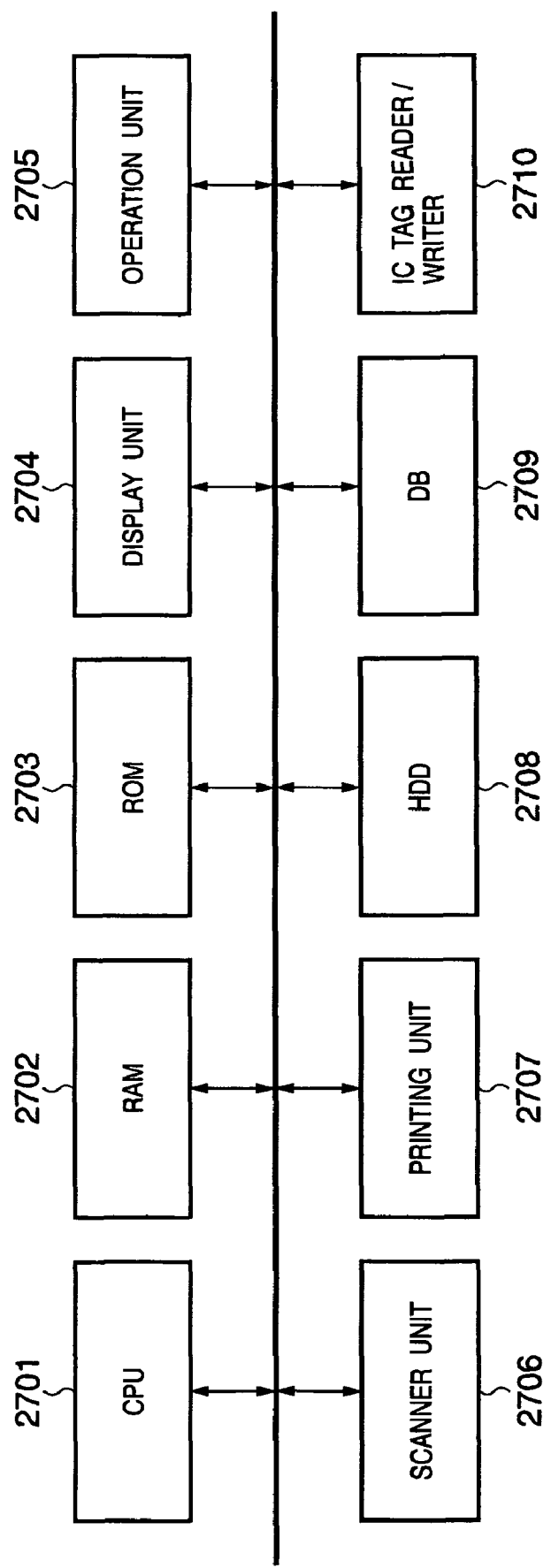
FIG. 27 is a block diagram showing an example of the configuration of a document management apparatus according to the embodiment of the present invention.

The edit processing unit 1010, print processing unit 1020, copy processing unit 1030, scan processing :unit 1040, storage processing unit 1050, and search processing unit 1060 can also be implemented by a document management apparatus shown in FIG. 27.

In FIG. 27, reference numeral 2701 denotes a CPU which controls the whole operation of the document management apparatus. Reference numeral 2702 denotes a RAM which is a system work memory used to operate the CPU 2701 and stores a program corresponding to a function that should be achieved by the document management apparatus. When the document management apparatus functions as, e.g., the edit processing unit 1010, the RAM stores an application program such as word processing software. By executing the program stored in the RAM, the CPU 2701 can operate as function modules as shown in FIGS. 4 to 10. Reference numeral 2703 denotes a ROM which stores the boot program of the system and the like. Reference numeral 2704 denotes a display unit which is formed from a liquid crystal display, LED, and the like, and displays predetermined information. Reference numeral 2705 denotes an operation unit having input keys for accepting an operation input from the user.

Reference numeral 2706 denotes a scanner unit which optically reads the contents of a paper document and converts them into electronic image data. Reference numeral 2707 denotes a printing unit which performs electrophotographic or inkjet print processing. Reference numeral 2708 denotes a hard disk device which stores programs necessary to achieve a predetermined function in the document management apparatus and stores a uniformed electronic document. Reference numeral 2709 denotes a database which stores a created/saved uniformed electronic document. Reference numeral 2710 denotes an IC tag reader/writer which communicates with an IC tag embedded in a paper document, writes information in the IC tag, and reads out information from the IC tag.

FIG. 2 is a schematic view showing an example of various types of processing information which are obtained and added along with transition in the respective processing units.

An example of basic processing in the overall configuration will be schematically explained mainly with reference to FIGS. 1 to 3B.

In step S3001, the edit processing unit 1010 performs edit processing. It is determined in step S3002 whether the processing performed in step S3001 is new electronic document creation processing. If it is determined that a new text electronic document is created by an application such as word processing software in a personal computer or the like to create a new electronic document in step S3001, the flow shifts to step S3003 to create a uniformed electronic document for uniformly holding processing information and the like together with the text electronic document serving as application data. If no new document is created, the flow shifts to step S3005. The edit processing unit 1010 records new generation information prepared by adding edit processing information 2002 to the current generation information held by an existing uniformed electronic document, which will be described after.

As shown in FIG. 2, processing information 2001 in new document generation contains the name of a user who created a document, the creation date and time, the location of the creation device, the location of created data, and the creation method. Of these pieces of information, the location of the creation device contains the network address of a personal computer or the like, and the location of created data contains the storage location (directory or path to a folder) of newly created document data. In this case, a new document is created, so the creation method is "new document generation".

A uniformed electronic document is a general term of electronic document data treated in the embodiment. The uniformed electronic document is formed by attaching a file which describes the contents of processing performed for electronic document data and generation information on the creation, to electronic document data such as document data or table data created by a predetermined application or scanner image data scanned and created by a scanner.

In step S3004, the new document creation processing information 2001 obtained when a new text electronic document is created by an application such as word processing software is recorded as generation information in the uniformed electronic document.

In step S3006, the print processing unit 1020 executes print processing. In this case, print processing is done in a combination of a personal computer or the like and a printing apparatus such as a printer. In step S3007, the print processing unit 1020 adds and records print processing information (2003) obtained in print processing, in the current generation information held by the uniformed electronic document. In step S3008, the print processing unit 1020 records, in the IC tag of the printout paper document, new generation information prepared by adding the print processing information 2003 to the current generation information.

As shown in FIG. 2, the print processing information 2003 contains the name of a user who printed, the printing date and time, the location of the printing device, and the printing method. Of these pieces of information, the location of the printing device contains a network address assigned to the printing apparatus. The printing method contains information on the printing paper size, the number of sheets, the number of copies, color/monochrome, and the like.

In step S3009, the copy processing unit 1030 executes copy processing. An apparatus such as a copying machine electrophotographically copies a paper document, and inputs/outputs data to/from an IC tag embedded in the paper document by using an existing technique as disclosed in Japanese Patent Laid-Open No. 2004-222085 described above. In step S3010, the copy processing unit 1030 adds and records copy processing information 2004 in the current generation information held by the IC tag attached to the paper document serving as a copy source. In step S3011, the copy processing unit 1030 also records, in the IC tag of the paper document serving as a copy destination, new generation information prepared by adding the copy processing information to the current generation information.

As shown in FIG. 2, the copy processing information 2004 contains the name of a user who copied the document, the copying date and time, the location of the copying device, and the copying method. Of these pieces of information, the location of the copying device contains a network address assigned to the copying apparatus. The copying method contains information on the paper size in copying, the number of sheets, the number of copies, color/monochrome, and the like.

In step S3012, the scan processing unit 1040 performs scan processing. An apparatus such as a scanner (the apparatus may be a single scanner apparatus or a multi-functional printer apparatus capable of using the scanner function) optically scans a paper document, and inputs/outputs data to/from an IC tag embedded in the paper document. In step S3013, the scan processing unit 1040 creates a uniformed electronic document using, as a text document, scan image data created by optical scanning. In step S3014, the scan processing unit 1040 adds and records scan processing information 2005 in the current generation information held by the IC tag of the scanned paper document. In step S3105, the scan processing unit 1040 also records, in the uniformed electronic document created in step S3013, new generation information prepared by adding the scan processing information 2005 to the current generation information.

As shown in FIG. 2, the scan processing information 2005 contains the name of a user who scanned the document, the scanning date and time, the scanning method, and the location of the scanning device. Of these pieces of information, the scanning method contains information on the scanned paper size, the resolution, color/monochrome, and the like. The location of the scanning device contains a network address assigned to the scanning apparatus.

In step S3016, the storage processing unit 1050 performs storage processing. In this case, storage processing is done in a combination of an application and apparatuses such as a personal computer and database. In step S3017, the storage processing unit 1050 adds storage processing information 2006 to the current generation information held by a uniformed electronic document to be stored, thereby recording new generation information.

As shown in FIG. 2, the storage processing information 2006 contains the name of a user who stored the document, the storage date and time, the storage method, the location of the storage device, and the location of stored data. Of these pieces of information, the storage method contains "save new", overwrite save, and "save as". The location of the storage device contains a network address assigned to the storage apparatus such as a database. The location of stored data is information representing the storage location of stored data in the storage device, and may be path information representing a predetermined directory location or folder location, or a URL (Uniform Resource Locator).

In step S3018, the search processing unit 1060 executes search processing. In this case, search processing is done in a combination of an application and apparatuses such as a personal computer and database. In step S3019, the search processing unit 1060 records new generation information prepared by adding search processing information 2007 to the current generation information held by a uniformed electronic document searched for by the search processing unit 1060.

As shown in FIG. 2, the search processing information 2007 contains the name of a user who searched for the document, the search date and time, the search method, and the location of the search device. Of these pieces of information, the search method contains a search keyword and search option. The location of the search device contains a network address assigned to an apparatus used for search processing.

Referring back to step S3001, the edit processing unit 1010 performs edit processing, ending one document lifecycle. Edit processing at this time is editing of an existing uniformed electronic document. Hence, it is determined in step S3002 that the processing is not new electronic document creation ("NO" in step S3002). The flow shifts to step S3005, and the edit processing unit 1010 records new generation information prepared by adding the edit processing information 2002 to the current generation information held by the existing uniformed electronic document.

As shown in FIG. 2, the edit processing information 2002 contains the name of a user who edited the document, the editing date and time, the location of the editing device, and the editing method. Of these pieces of information, the location of the editing device contains a network address assigned to an apparatus such as a personal computer used for edit processing. The editing method contains information on the editing method such as overwrite or edit with the log.

Figure 10:
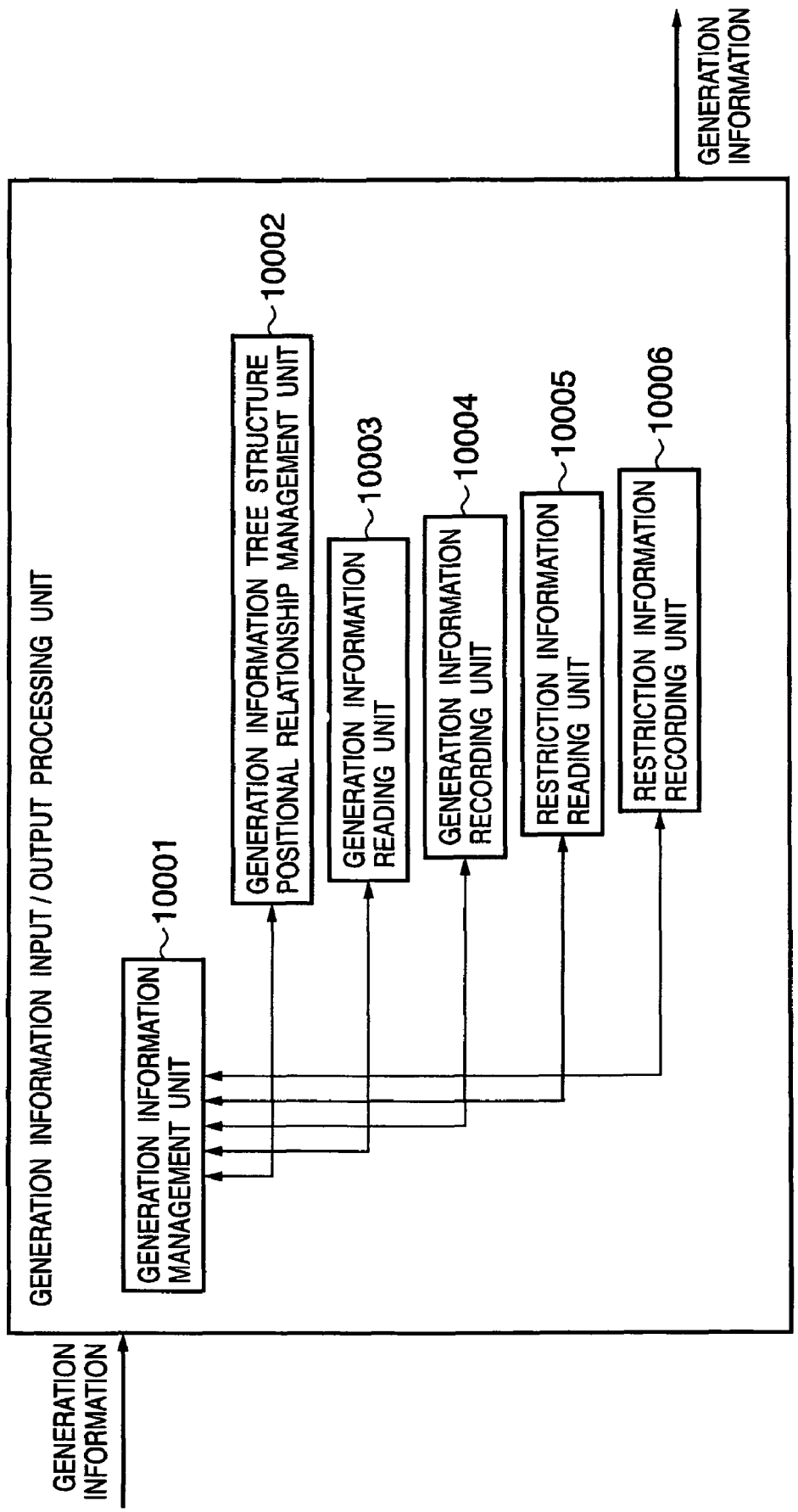
FIG. 10 is a block diagram showing corresponding to an example of a module configuration in a generation information input/output processing unit according to the embodiment of the present invention.
Figure 11:
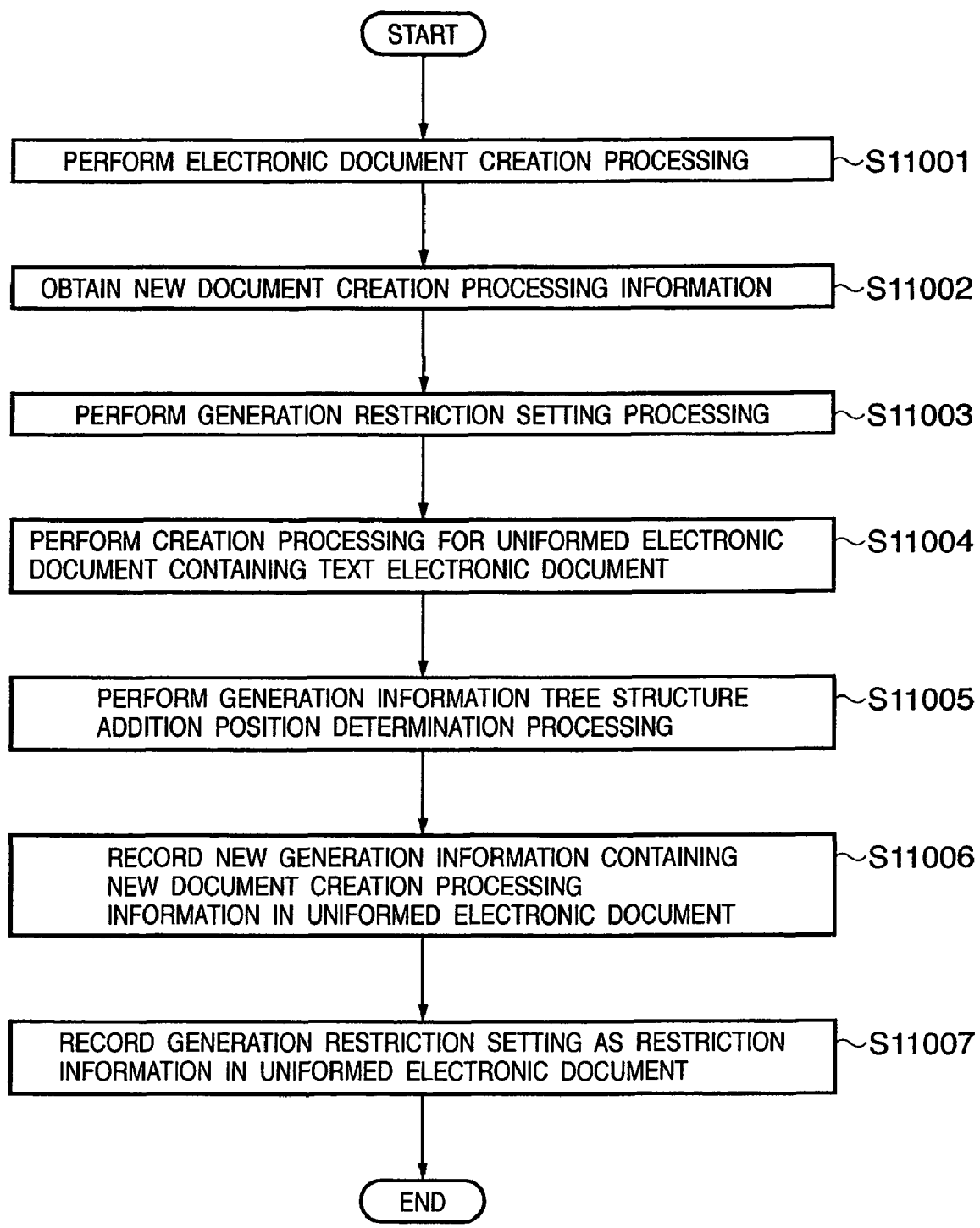
FIG. 11 is a flowchart corresponding to an example of new uniformed electronic document creation processing according to the embodiment of the present invention.

Details of each processing will be explained. New document creation processing corresponding to steps S3001 to S3004 in FIG. 3A will be described in detail mainly with reference to FIGS. 4, 10, and 11. FIG. 4 is a block diagram showing a module configuration in the edit processing unit 1010. FIG. 10 is a block diagram showing the configuration of a generation information input/output processing unit corresponding to a generation information input/output processing unit 4002 for a uniformed electronic document in FIG. 4. FIG. 11 is a flowchart showing an example of new uniformed electronic document creation processing.

Figure 22:
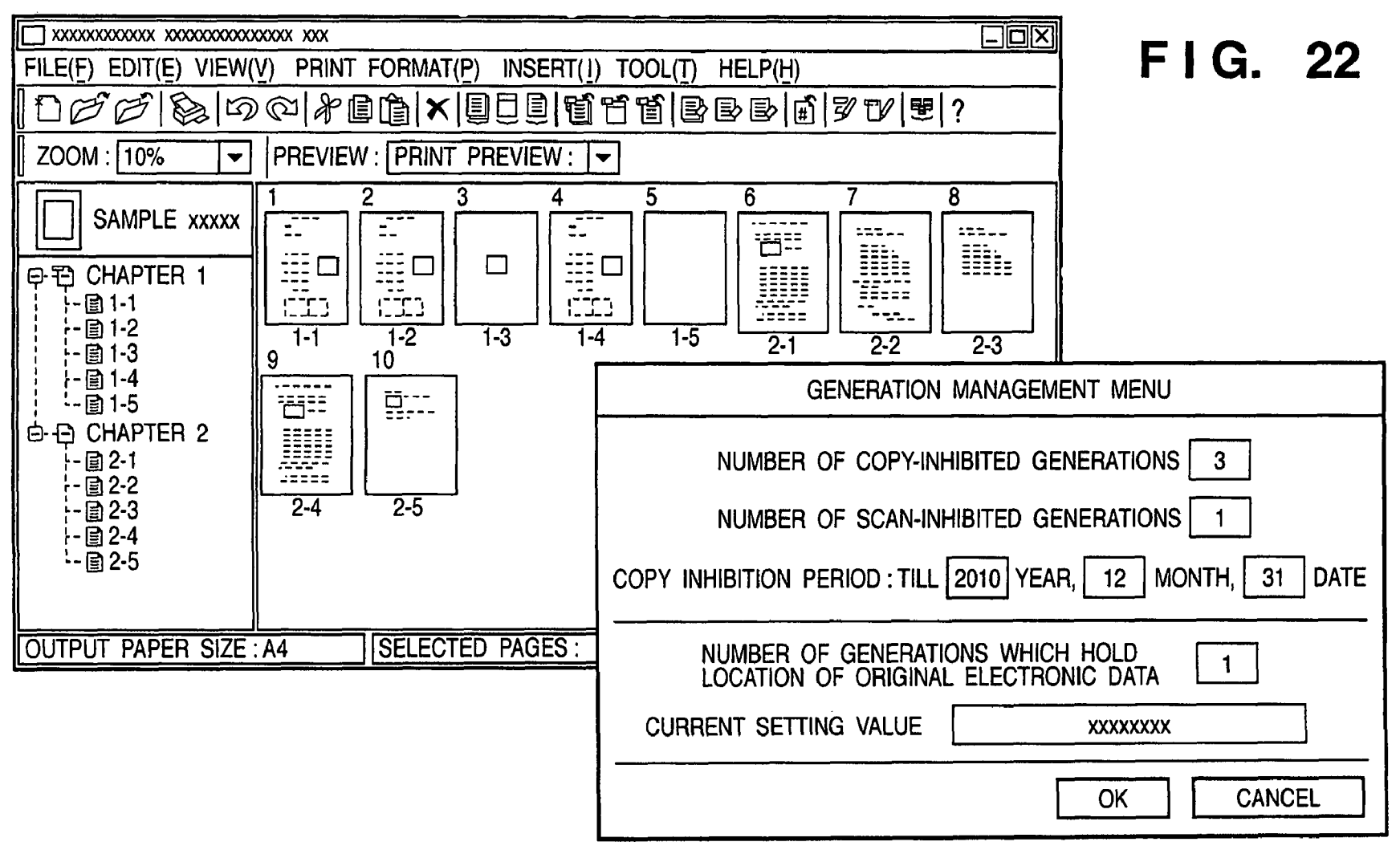

In FIG. 4, reference numeral 4001 denotes an edit processing control unit which controls the whole processing in the edit processing unit 1010. The generation information input/output processing unit 4002 for a uniformed electronic document inputs/outputs generation information. A detailed configuration of the generation information input/output processing unit 4002 for a uniformed electronic document is shown in FIG. 10. Reference numeral 4003 denotes a restriction information setting unit which provides the user with a user interface as shown in FIG. 22, and accepts settings such as the number of copy-inhibited generations, the number of scan-inhibited generations, the copy inhibition period, the number of generations which hold the location of original electronic data, and the current setting value.

Reference numeral 4004 denotes an edit processing restriction determination unit which determines whether edit processing is restricted on the basis of restriction information. Reference numeral 4005 denotes an electronic document edit processing information obtaining unit which obtains, via the edit processing control unit 4001, edit processing information on an electronic document created by an application. Reference numeral 4006 denotes an electronic document creation processing information obtaining unit which obtains new document creation processing information via the edit processing control unit 4001 when a new electronic document is created by an application. Reference numeral 4007 denotes a uniformed electronic document creation unit which creates a uniformed electronic document from an electronic document created and edited by an application. Reference numeral 4008 denotes a uniformed electronic document rewrite unit which rewrites a uniformed electronic document.

In FIG. 10, reference numeral 10001 denotes a generation information management unit which manages the entire generation information input/output processing unit. Reference numeral 10002 denotes a generation information tree structure positional relationship management unit which determines, in a tree structure, the positional relationship between newly added generation information and previous generation information. Reference numeral 10003 denotes a generation information reading unit which reads generation information attached to a uniformed electronic document and generation information stored in an IC tag attached to a paper document. Reference numeral 10004 denotes a generation information recording unit which overwrites existing generation information attached to a uniformed electronic document by recording predetermined processing information. Reference numeral 10005 denotes a restriction information reading unit which extracts encrypted restriction information from generation information attached to a uniformed electronic document or generation information recorded in an IC tag, decrypts the extracted restriction information, and reads the contents of the restriction information. Reference numeral 10006 denotes a restriction information recording unit which overwrites/rewrites, with new restriction information, existing restriction information in generation information attached to a uniformed electronic document.

In step S11001 of FIG. 11, an electronic document is created by an application such as word processing software. In step S1102, the electronic document creation processing information obtaining unit 4006 obtains the new document creation processing information 2001 from the application. In step S11003, the restriction information setting unit 4003 accepts input of generation restriction setting by using an input window as shown in FIG. 22. In step S11004, the uniformed electronic document creation unit 4007 creates a uniformed electronic document using application data as a text electronic document. In step S11005, the generation information tree structure positional relationship management unit 10002 of the generation information input/output unit 4002 for a uniformed-electronic document determines the position where the new document creation processing information is added to existing generation information for the uniformed electronic document.

Figure 23B:
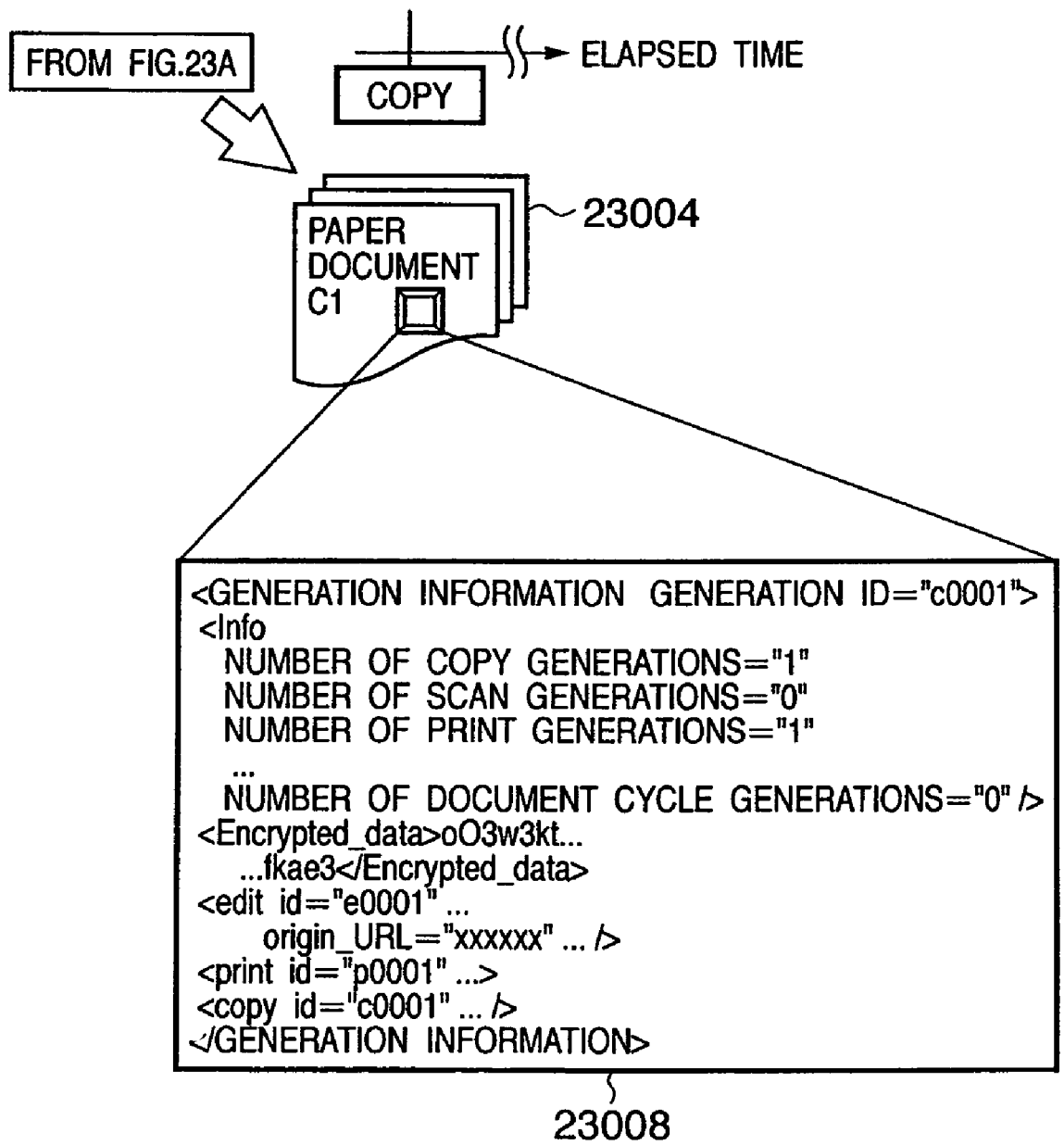

In step S11006, on the basis of the determined generation information tree structure positional relationship, the generation information recording unit 10004 of the generation information input/output processing unit 4002 for a uniformed electronic document overwrites the uniformed electronic document by recording new generation information prepared by adding the new document creation processing information to the existing generation information. The overwritten generation information is represented by 23005 in FIG. 23A. Since creation of an electronic document in step S11001 is creation of a new document, new document creation processing information added to generation information is added immediately after <Encrypted_data> . . . </Encrypted_data> between which restriction information is encrypted and recorded. In FIGS. 23A and 23B, information added on the basis of the new document creation processing information is described as <edit. id=".e0001" . . . .>

In step S11007, the restriction information recording unit 10006 of the generation information input/output processing unit 4002 for a uniformed electronic document records, as restriction information in generation information of the uniformed electronic document, the generation restriction setting contents which are set using the user interface in FIG. 22. By the above processing, the new document creation processing information in new document creation processing can be contained in the generation information of the uniformed electronic document. Note that the structure of generation information and a change of the generation information before and after processing will be described in detail later with reference to FIGS. 23A and 23B.

Figure 12B:
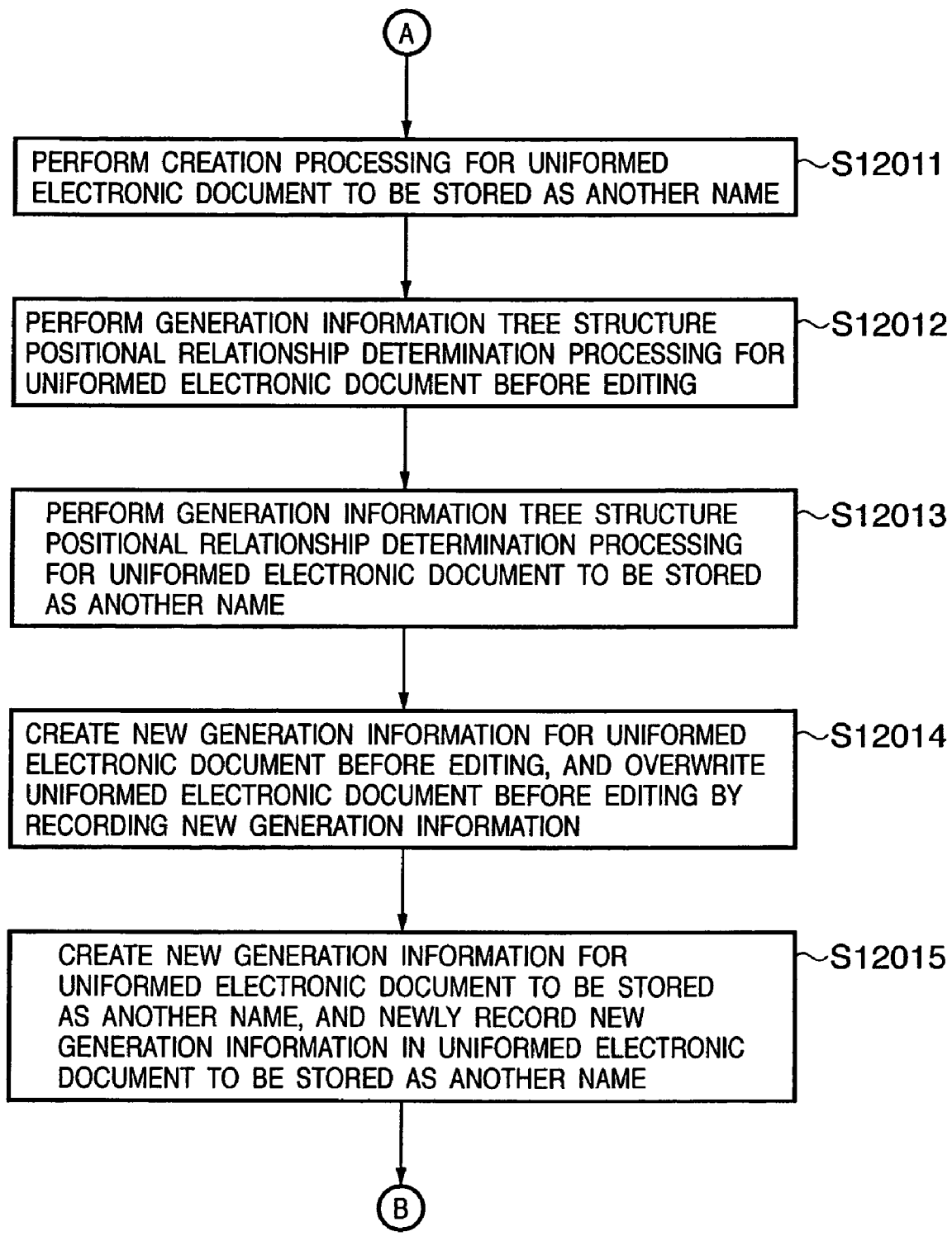
FIG. 12B is a flowchart corresponding to an example of existing uniformed electronic document edit processing according to the embodiment of the present invention.

Edit processing for an existing uniformed electronic document that corresponds to steps S3001 and S3005 in FIG. 3A will be described in detail mainly with reference to FIGS. 4, 10, 12A, and 12B. FIG. 12A and 12B are flowcharts showing an example of uniformed electronic document edit processing.

In step S12001 of FIG. 12A, the generation information reading unit 10003 of the generation information input/output unit 4002 for a uniformed electronic document obtains generation information from a uniformed electronic document. In step S12002, the restriction information reading unit 10005 obtains restriction information. In step S12003, the edit processing restriction determination unit 4004 checks restriction information, and determines whether edit processing can continue. If the processing cannot continue, it ends.

If the processing can continue, the flow shifts to step S12004, and the edit processing control unit 4001 obtains a text electronic document from the uniformed electronic document. In step S12005, edit processing for the text electronic document is performed. In step S12006, the electronic document edit processing information obtaining unit 4005 obtains edit processing information. The flow advances to step S12007 to accept selection of the storage method.

If overwrite save is selected, the flow shifts to step S12008, and the uniformed electronic document rewrite unit 4008 executes overwrite save processing for the text electronic document in the uniformed electronic document. The flow shifts to step S12009, and the generation information positional relationship management unit 10002 of the generation information input/output processing unit 4002 for a uniformed electronic document performs generation information tree structure positional relationship determination processing, and determines the position where the edit processing information is added to existing generation information. In this case, a position, representing a positional relationship in the tree structure in which the current document (uniformed electronic document after editing) is a descendant of the document before editing, is determined for information held by the original uniformed electronic document before editing. The edit processing information is added to the position. In step S12010, on the basis of the determined generation information tree structure positional relationship, the generation information recording unit 10004 of the generation information input/output processing unit 4002 for a uniformed electronic document overwrites the uniformed electronic document by recording new generation information prepared by adding the edit processing information to the existing generation information.

If "save as" is selected, the flow shifts to step S12011, and the uniformed electronic document creation unit 4007 uses a copy of the edited text electronic document and creates a uniformed electronic document to be stored as another name. In step S12012, the generation information tree structure positional relationship management unit 10002 of the generation information input/output processing unit 4002 for a uniformed electronic document performs generation information tree structure positional relationship determination processing for a uniformed electronic document before editing, and determines the position where the edit processing information is added to existing generation information for the uniformed electronic document before editing. In this case, a position, where the generation relationship in which a descendant is added is represented by a positional relationship in the tree structure, is determined for information held by the original uniformed electronic document before editing.

In step S12013, the generation information positional relationship management unit 10002 performs generation information tree structure positional relationship determination processing for the uniformed electronic document to be stored as another name, and determines the position where the edit processing information is added to existing generation information for the uniformed electronic document to be stored as another name. In this case, a position, where the generation relationship in which the current document (uniformed electronic document to be stored as another name) is a descendant of the document before editing is represented by a positional relationship in the tree structure for information originally held by the uniformed electronic document before editing, is determined for the uniformed electronic document to be stored as another name.

In step S12014, on the basis of each determined generation information tree structure positional relationship, the generation information recording unit 10004 of the generation information input/output processing unit 4002 for a uniformed electronic document overwrites the uniformed electronic document before editing by recording new generation information prepared by adding the edit processing information to the existing generation information for the uniformed electronic document before editing. In step S12015, the generation information recording unit 10004 of the generation information input/output processing unit 4002 for a uniformed electronic document newly records in the uniformed electronic document to be stored as another name, new generation information prepared by adding the edit processing information to the existing generation information for the uniformed electronic document to be stored as another name.

By the above processing the edit processing information in edit processing can be contained in the generation information of the uniformed electronic document before editing and that of the uniformed electronic document after editing.

Figure 13:
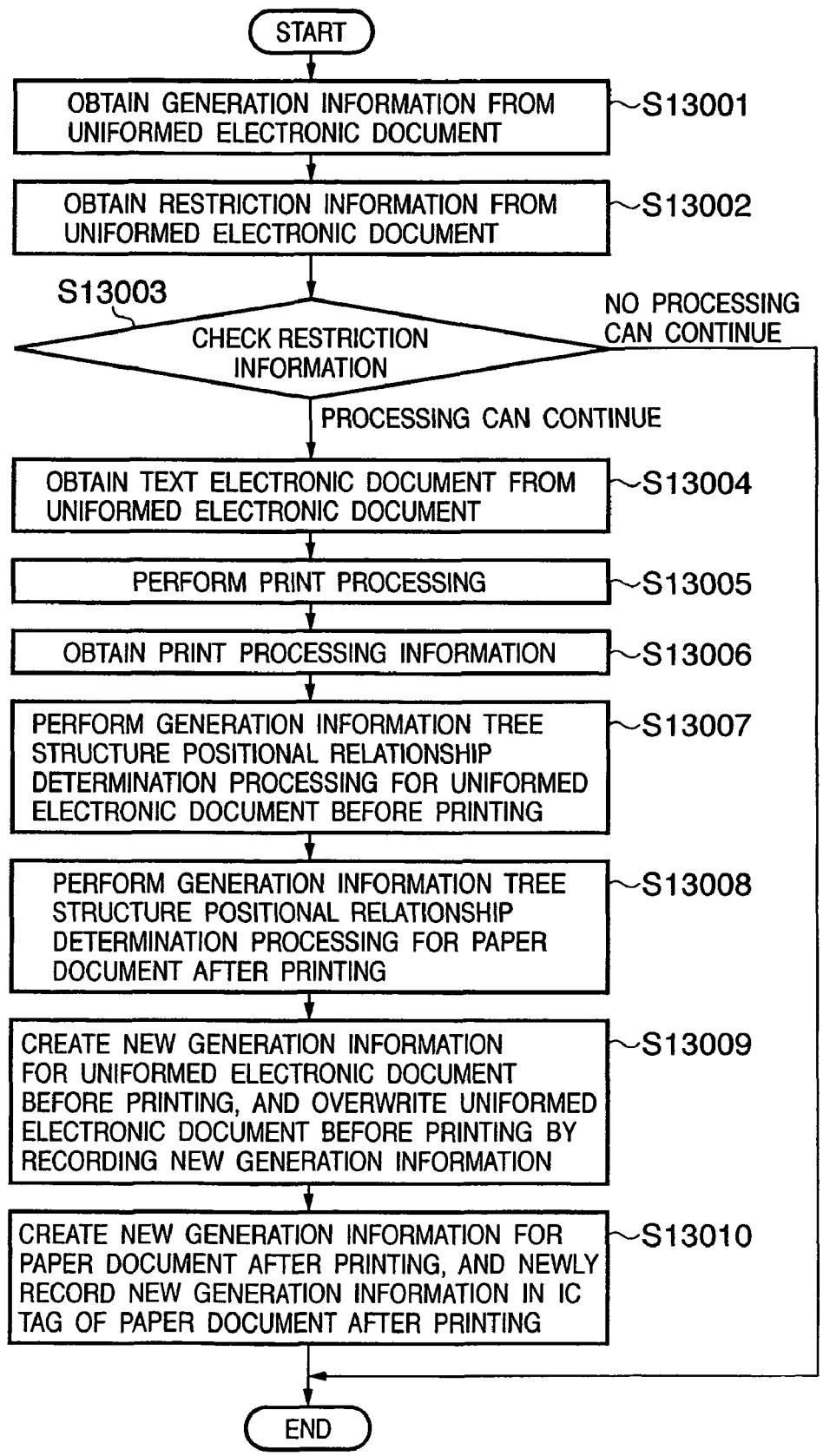
FIG. 13 is a flowchart corresponding to an example of print processing according to the embodiment of the present invention.

Print processing in steps S3006 to S3008 will be described in detail mainly with reference to FIGS. 5, 10, and 13. FIG. 5 is a block diagram showing a module configuration in the print processing unit 1020. FIG. 13 is a flowchart showing an example of uniformed electronic document print processing.

In FIG. 5, reference numeral 5001 denotes a print processing control unit which controls the whole processing in the print processing unit 1020. Reference numeral 5002 denotes an IC tag data reception unit which receives predetermined data from an IC tag attached to a paper document. Reference numeral 5003 denotes an IC tag data transmission unit for an IC tag attached to a paper document or printing paper. The IC tag data transmission unit 5003 transmits predetermined data to an IC tag attached to a paper document or printing paper.

Reference numeral 5004 denotes a generation information input/output processing unit for a uniformed electronic document in printing. The generation information input/output processing unit 5004 performs input/output processing for generation information of a uniformed electronic document. A more detailed configuration of the generation information input/output processing unit 5004 is shown in FIG. 10. Reference numeral 5005 denotes a generation information input/output processing unit for an IC tag in printing. The generation information input/output processing unit 5005 performs input/output processing for generation information of a paper document after printing. A more detailed configuration of the generation information input/output processing unit 5005 is shown in FIG. 10. Reference numeral 5006 denotes a print data creation unit which creates print data subjected to print processing. Reference numeral 5007 denotes a print processing restriction determination unit which determines whether print processing is restricted on the basis of restriction information. Reference numeral 5008 denotes a print processing information obtaining unit which obtains print processing information on print processing to be executed by the print processing control unit 5001. Reference numeral 5009 denotes a text electronic document obtaining unit which obtains a text electronic document from the storage location (contained in generation information) of the text of the electronic document.

In step S13001 of FIG. 13, the generation information reading unit 10003 of the generation information input/output processing unit 5004 for a uniformed electronic document in printing obtains generation information of a uniformed electronic document. In step S13002, the restriction information reading unit 10005 obtains restriction information. In step S13003, on the basis of the restriction information, the print processing restriction determination unit 5007 determines whether print processing can continue. If the processing cannot continue, it ends; if the processing can continue, the text electronic document obtaining unit 5009 obtains a text electronic document from the uniformed electronic document in step S13004. In step S13005, print processing is executed after creation of print data from the obtained text electronic document.

In step S13006, the print processing information obtaining unit 5008 obtains print processing information. In step S13007, the generation information positional relationship management unit 10002 of the generation information input/output processing unit 5004 for a uniformed electronic document in printing performs generation information tree structure positional relationship determination processing for the uniformed electronic document before printing, and determines the position where the print processing information is added to existing generation information for the uniformed electronic document before printing. At this time, a position where the generation relationship in which a descendent is added is represented by a positional relationship in the tree structure for generation information held by the original uniformed electronic document before printing is determined as the addition position on the uniformed electronic document before printing.

In step S13008, the generation information positional relationship management unit 10002 of the generation information input/output processing unit 5005 for an IC tag in printing performs generation information tree structure positional relationship determination processing for the paper document after printing, and determines the position where the print processing information is added to existing generation information for the paper document after printing. At this time, a position where the generation relationship in which the current document (paper document after printing) is a descendant of the document before printing is represented by a positional relationship in the tree structure for generation information held by the original uniformed electronic document before printing is determined as the addition position on the paper document after printing.

In step S13009, on the basis of each determined generation information tree structure positional relationship, the generation information recording unit 10004 of the generation information input/output processing unit 5004 for a uniformed electronic document in printing overwrites the uniformed electronic document before printing by recording new generation information prepared by adding the print processing information to the existing generation information for the uniformed electronic document before printing. In step S13010, the generation information recording unit 10004 of the generation information input/output processing unit 5005 for an IC tag in printing newly records, in the IC tag of the paper document serving as a print destination via the IC tag data transmission unit 5003, new generation information prepared by adding the print processing information to the existing generation information for the paper document serving as a print destination.

By the above processing, the print processing information in print processing can be contained in the generation information of the uniformed electronic document serving as a print source and that of the paper document serving as a print destination.

Figure 6:
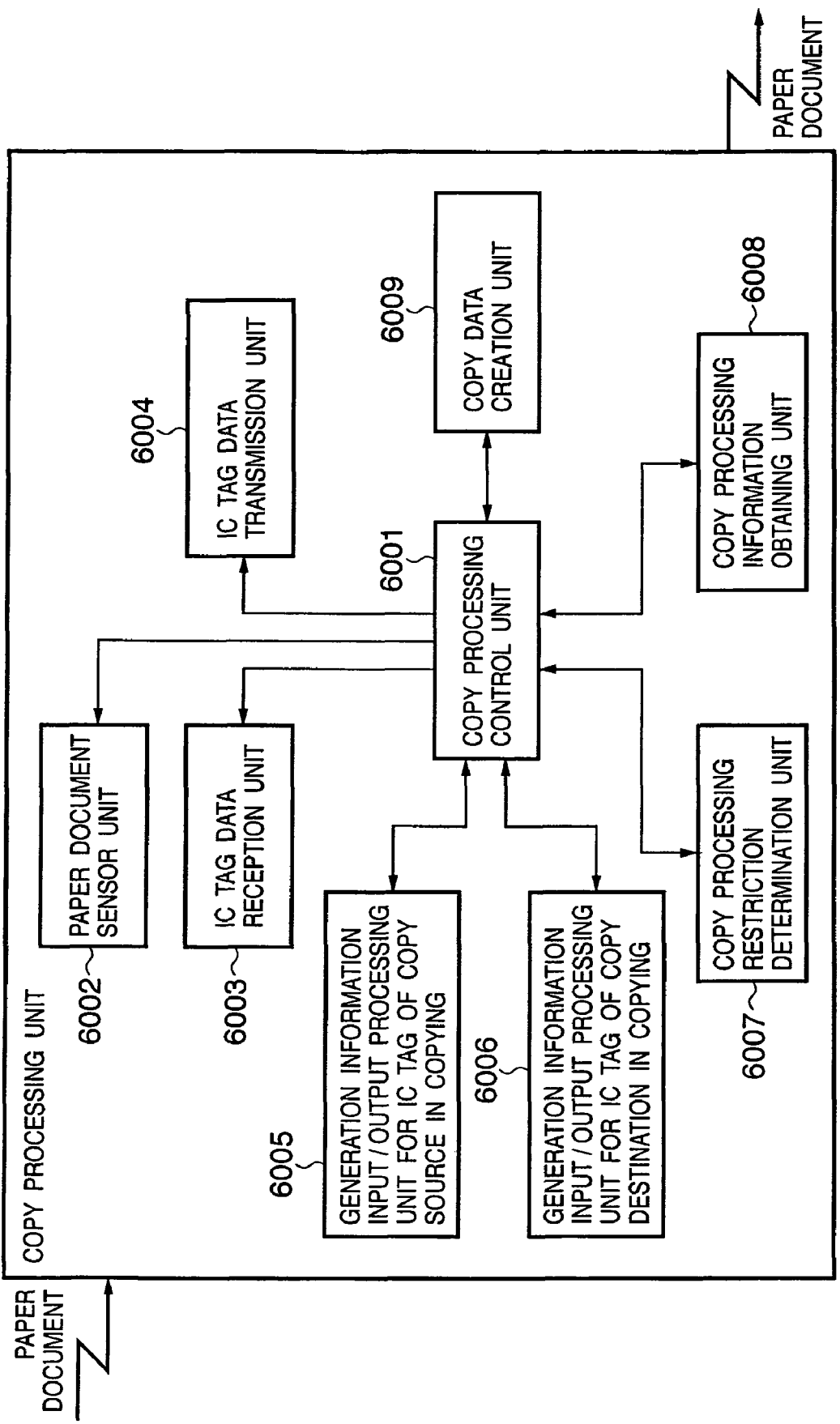
FIG. 6 is a block diagram corresponding to an example of a module configuration in a copy processing unit according to the embodiment of the present invention.
Figure 14:
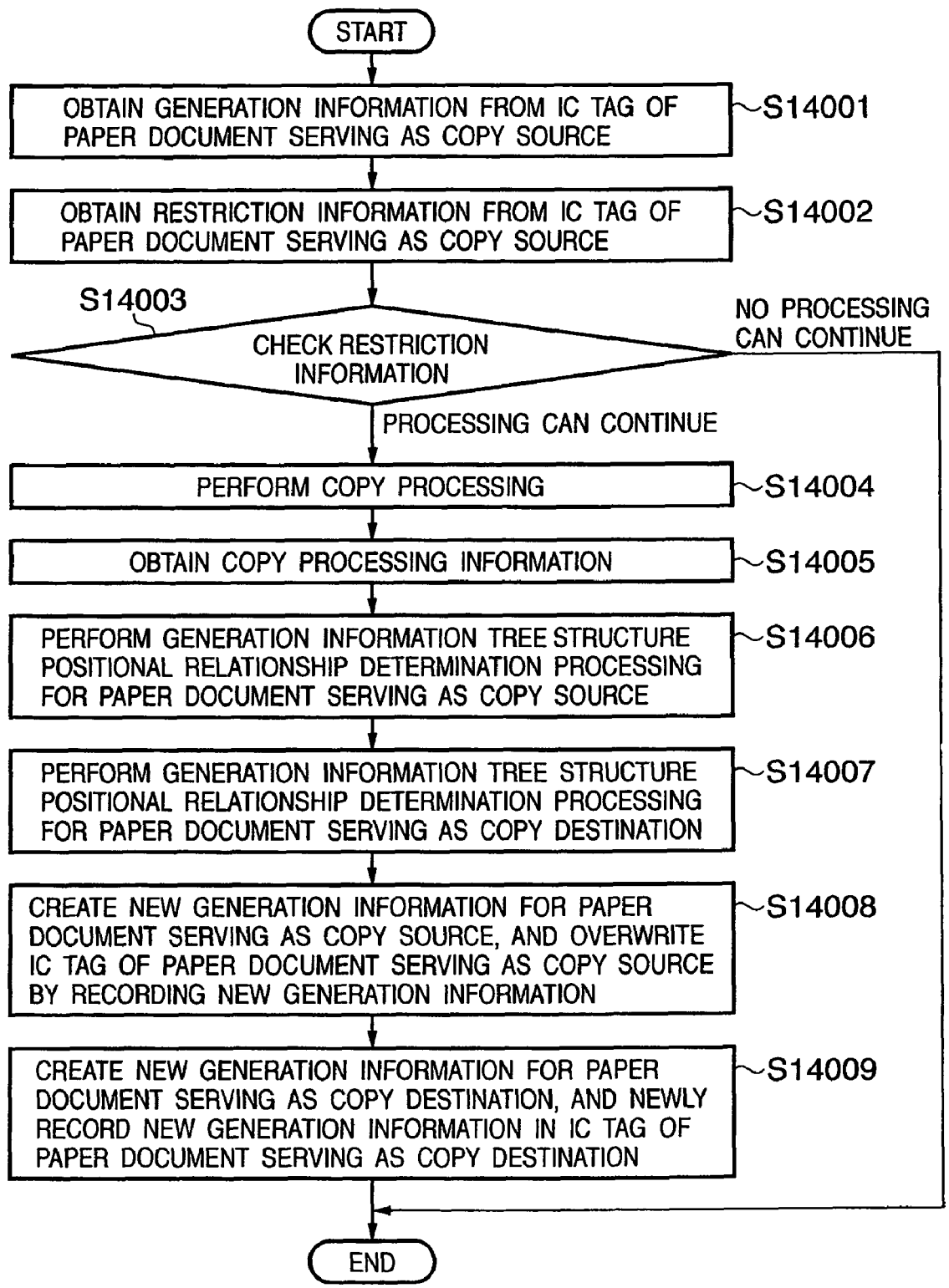
FIG. 14 is a flowchart corresponding to an example of copy processing according to the embodiment of the present invention.

Copy processing in steps S3009 to S3011 will be described in detail mainly with reference to FIGS. 6, 10, and 14. FIG. 6 is a block diagram showing a module configuration in the copy processing unit 1030. FIG. 14 is a flowchart showing an example of paper document copy processing.

In FIG. 6, reference numeral 6001 denotes a copy processing control unit which controls the whole processing in the copy processing unit 1030. Reference numeral 6002 denotes a paper document sensor unit which obtains, from an optical image sensing unit such as a CCD, image information of a paper document subjected to copy processing. Reference numeral 6003 denotes an IC tag data reception unit which receives predetermined data from an IC tag attached to a paper document. Reference numeral 6004 denotes an IC tag data transmission unit which transmits predetermined data to an IC tag attached to a paper document.

Reference numeral 6005 denotes a generation information input/output processing unit for the IC tag of a copy source in copying. The generation information input/output processing unit 6005 performs input/output processing for generation information of a paper document serving as a copy source. A more detailed configuration of the generation information input/output processing unit 6005 is shown in FIG. 10. Reference numeral 6006 denotes a generation information input/output processing unit for the IC tag of a copy destination in copying. The generation information input/output processing unit 6006 performs input/output processing for generation information of a paper document serving as a copy destination. A more detailed configuration of the generation information input/output processing unit 6006 is shown in FIG. 10. Reference numeral 6007 denotes a copy processing restriction determination unit which determines whether copy processing is restricted on the basis of restriction information. Reference numeral 6008 denotes a copy processing information obtaining unit which obtains copy processing information on copy processing to be executed by the copy processing control unit 6001. Reference numeral 6009 denotes a copy data creation unit which creates copy data subjected to copy processing.

In step S14001 of FIG. 14, the generation information reading unit 10003 of the generation information input/output processing unit 6005 for the IC tag of a copy source in copying obtains generation information from the IC tag of a paper document serving as a copy source via the IC tag data reception unit 6003. In step S14002, the restriction information reading unit 10005 obtains restriction information.

In step S14003, on the basis of the restriction information, the copy processing restriction determination unit 6007 determines whether copy processing can continue. If the processing cannot continue, it ends; if the processing can continue, the copy data creation unit 6009 performs copy processing on the basis of document information obtained by the paper document sensor unit 6002 in step S14004. In step S14005, the copy processing information obtaining unit 6008 obtains copy processing information from the copy processing control unit 6001.

In step S14006, the generation information positional relationship management unit 10002 of the generation information input/output processing unit 6005 for the IC tag of a copy source in copying performs generation information tree structure positional relationship determination processing for a paper document serving as a copy source, and determines the position where the copy processing information is added to existing generation information for the paper document serving as a copy source. At this time, a position where the generation relationship in which a descendent is added is represented by a positional relationship in the tree structure for generation information held by the original paper document serving as a copy source is determined as the addition position on the paper document serving as a copy source.

In step S14007, the generation information positional relationship management unit 10002 of the generation information input/output processing unit 6006 for the IC tag of a copy destination in copying performs generation information tree structure positional relationship determination processing for a paper document serving as a copy destination, and determines the position where the copy processing information is added to existing generation information for the paper document serving as a copy destination. In this case, a position where the generation relationship in which the current document (paper document serving as a copy destination) is a descendant of the document before copying is represented by a positional relationship in the tree structure for generation information held by the original paper document serving as a copy source is determined as the addition position on the paper document serving as a copy destination.

In step S14008, on the basis of each determined generation information tree structure positional relationship, the generation information recording unit 10004 of the generation information input/output processing unit 6005 for the IC tag of a copy source in copying overwrites the IC tag of the paper document serving as a copy source via the IC tag data transmission unit 6004 by recording new generation information prepared by adding the copy processing information to the existing generation information for the paper document serving as a copy source.

In step S14009, the generation information recording unit 10004 of the generation information input/output processing unit 6006 for the IC tag of a copy destination in copying newly records, in the IC tag of the paper document serving as a copy destination via the IC tag data transmission unit 6004, new generation information prepared by adding the copy processing information to the existing generation information for the paper document serving as a copy destination.

By the above processing, the copy processing information in copy processing can be contained in the generation information of the paper document serving as a copy source and that of the paper document serving as a copy destination.

Figure 7:
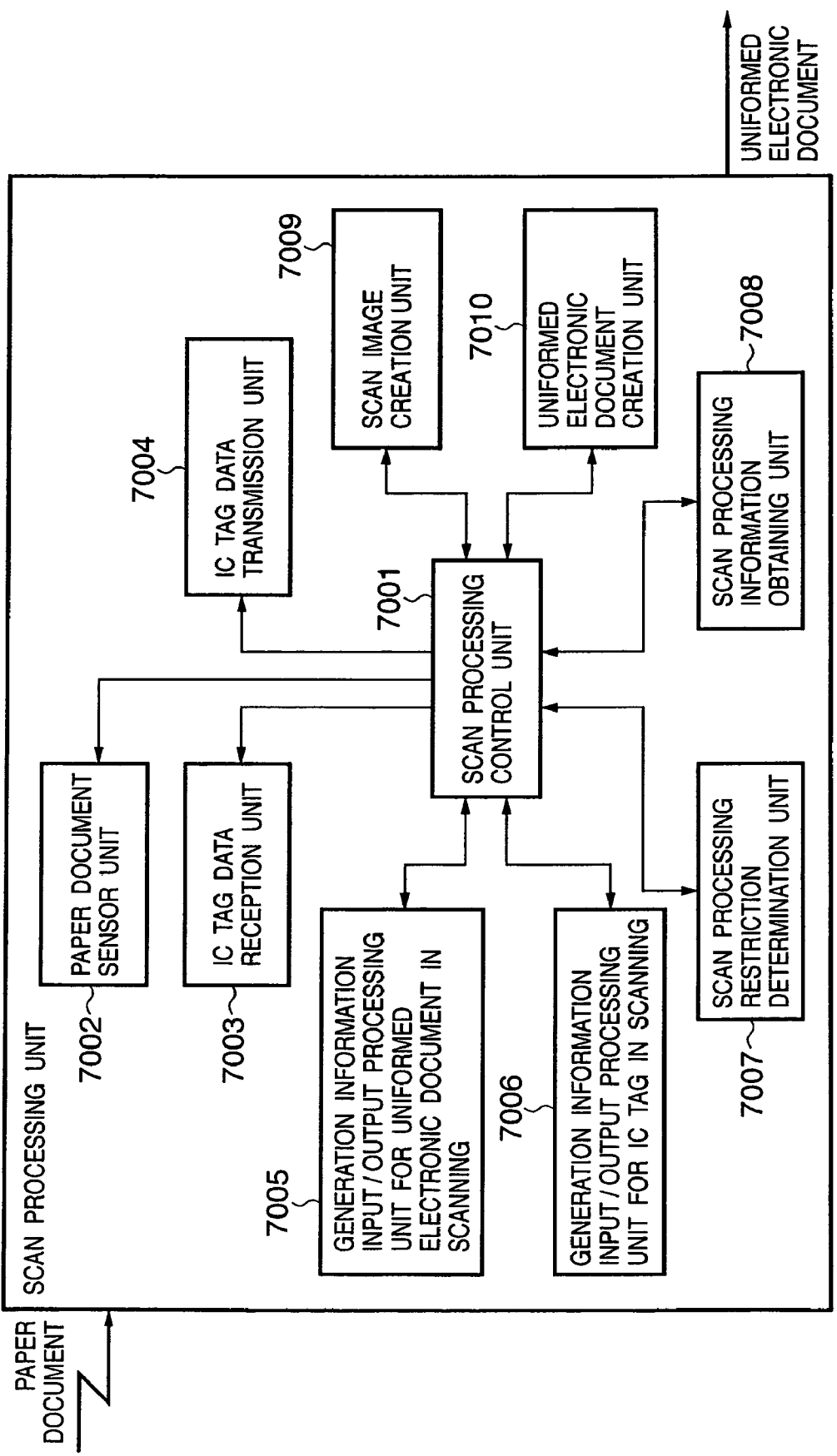
FIG. 7 is a block diagram corresponding to an example of a module configuration in a scan processing unit according to the embodiment of the present invention.
Figure 15:
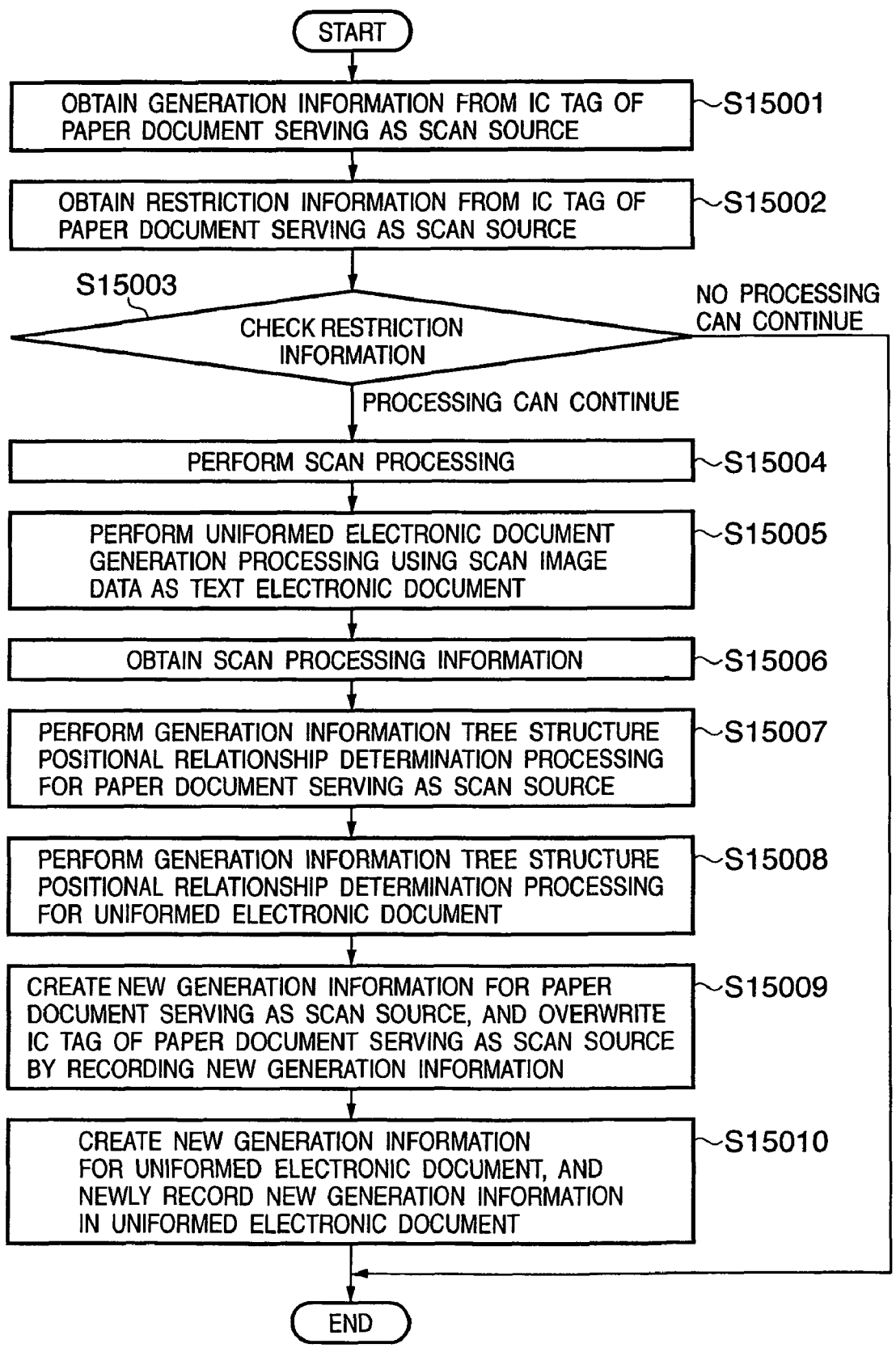
FIG. 15 is a flowchart corresponding to an example of scan processing according to the embodiment of the present invention.

Scan processing in steps S3012 to S3015 will be described in detail mainly with reference to FIGS. 7, 10, and 15. FIG. 7 is a block diagram showing a module configuration in the scan processing unit 1040. FIG. 15 is a flowchart showing an example of paper document scan processing.

In FIG. 7, reference numeral 7001 denotes a scan processing control unit which controls the whole processing in the scan processing unit 1040. Reference numeral 7002 denotes a paper document sensor unit which obtains, from an optical image sensing unit such as a CCD, image information of a paper document to be scanned. Reference numeral 7003 denotes an IC tag data reception unit which receives predetermined data from an IC tag attached to a paper document. Reference numeral 7004 denotes an IC tag data transmission unit which transmits predetermined data to an IC tag attached to a paper document.

Reference numeral 7005 denotes a generation information input/output processing unit for a uniformed electronic document in scanning. The generation information input/output processing unit 7005 performs input/output processing for generation information of a uniformed electronic document created by scan processing. A more detailed configuration of the generation information input/output processing unit 7005 is shown in FIG. 10. Reference numeral 7006 denotes a generation information input/output processing unit for an IC tag in scanning. The generation information input/output processing unit 7006 performs input/output processing for generation information of a paper document serving as a scan source. A more detailed configuration of the generation information input/output processing unit 7006 is shown in FIG. 10. Reference numeral 7007 denotes a scan processing restriction determination unit which determines whether scan processing is restricted on the basis of restriction information. Reference numeral 7008 denotes a scan processing information obtaining unit which obtains scan processing information on scan processing to be executed by the scan processing control unit 7001. Reference numeral 7009 denotes a scan image creation unit which creates a scan image copy on the basis of electronic data obtained by the paper document sensor 7002. Reference numeral 7010 denotes a uniformed electronic document creation unit which creates a uniformed electronic document on the basis of the created scan image and scan processing information.

In step S15001 of FIG. 15, the generation information reading unit 10003 of the generation information input/output processing unit 7006 for an IC tag in scanning obtains generation information from the IC tag of a paper document serving as a scan source via the IC tag data reception unit 7003. In step S15002, the restriction information reading unit 10005 obtains. restriction information. In step S15003, on the basis of the restriction information, the scan processing restriction determination unit 7007 determines whether to continue scan processing. If the processing cannot continue, it ends; if the processing can continue, the flow shifts to step S15004. The paper document sensor 7002 performs scan processing. In step S15005, the scan image creation unit 7009 and uniformed electronic document creation unit 7010 create a uniformed electronic document as a text electronic document from scan image data. In step S15006, the scan processing information obtaining unit 7008 obtains scan processing information from the scan processing control unit 7001.

In step S15007, the generation information positional relationship management unit 10002 of the generation information input/output processing unit 7006 for an IC tag in scanning performs generation information tree structure positional relationship determination processing for a paper document serving as a scan source, and determines the position where the scan processing information is added to existing generation information for the paper document serving as a scan source. At this time, a position where the generation relationship in which a descendent is added is represented by a positional relationship in the tree structure for generation information held by the original paper document serving as a scan source is determined as the addition position on the paper document serving as a scan source.

In step S15008, the generation information positional relationship management unit 10002 of the generation information input/output processing unit 7005 for a uniformed electronic document in scanning performs generation information tree structure positional relationship determination processing for a uniformed electronic document, and determines the position where the scan processing information is added to existing generation information for the uniformed electronic document. In this case, a position where the generation relationship in which the current document (uniformed electronic document) is a descendant of the document before scanning is represented by a positional relationship in the tree structure for generation information held by the original paper document serving as a scan source is determined as the addition position on the uniformed electronic document.

In step S15009, on the basis of each determined generation information tree structure positional relationship, the generation information recording unit 10004 of the generation information input/output processing unit 7006 for an IC tag in scanning overwrites the IC tag of the paper document serving as a scan source via the IC tag data transmission unit 7004 by recording new generation information prepared by adding the scan processing information to the existing generation information for the paper document serving as a scan source. In step S15010, the generation information recording unit 10004 of the generation information input/output processing unit 7005 for a uniformed electronic document in scanning newly records, in the uniformed electronic document, new generation information prepared by adding the scan processing information to the existing generation information for the uniformed electronic document.

By the above processing, the scan processing information in scan processing can be contained in the generation information of the uniformed electronic document created by scan processing and that of the paper document serving as a scan source.

Figure 8:
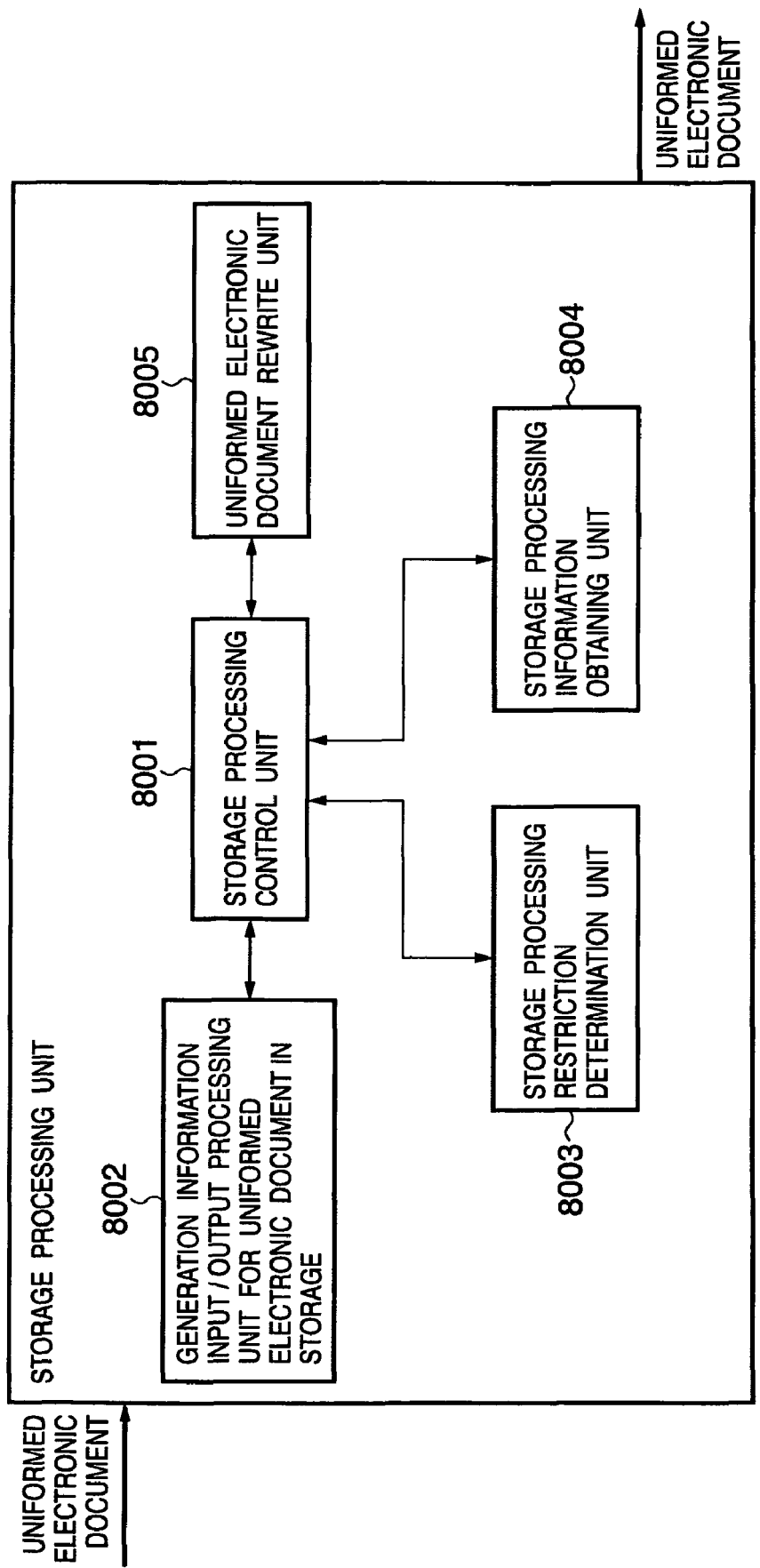
FIG. 8 is a block diagram corresponding to an example of a module configuration in a storage processing unit according to the embodiment of the present invention.
Figure 16:
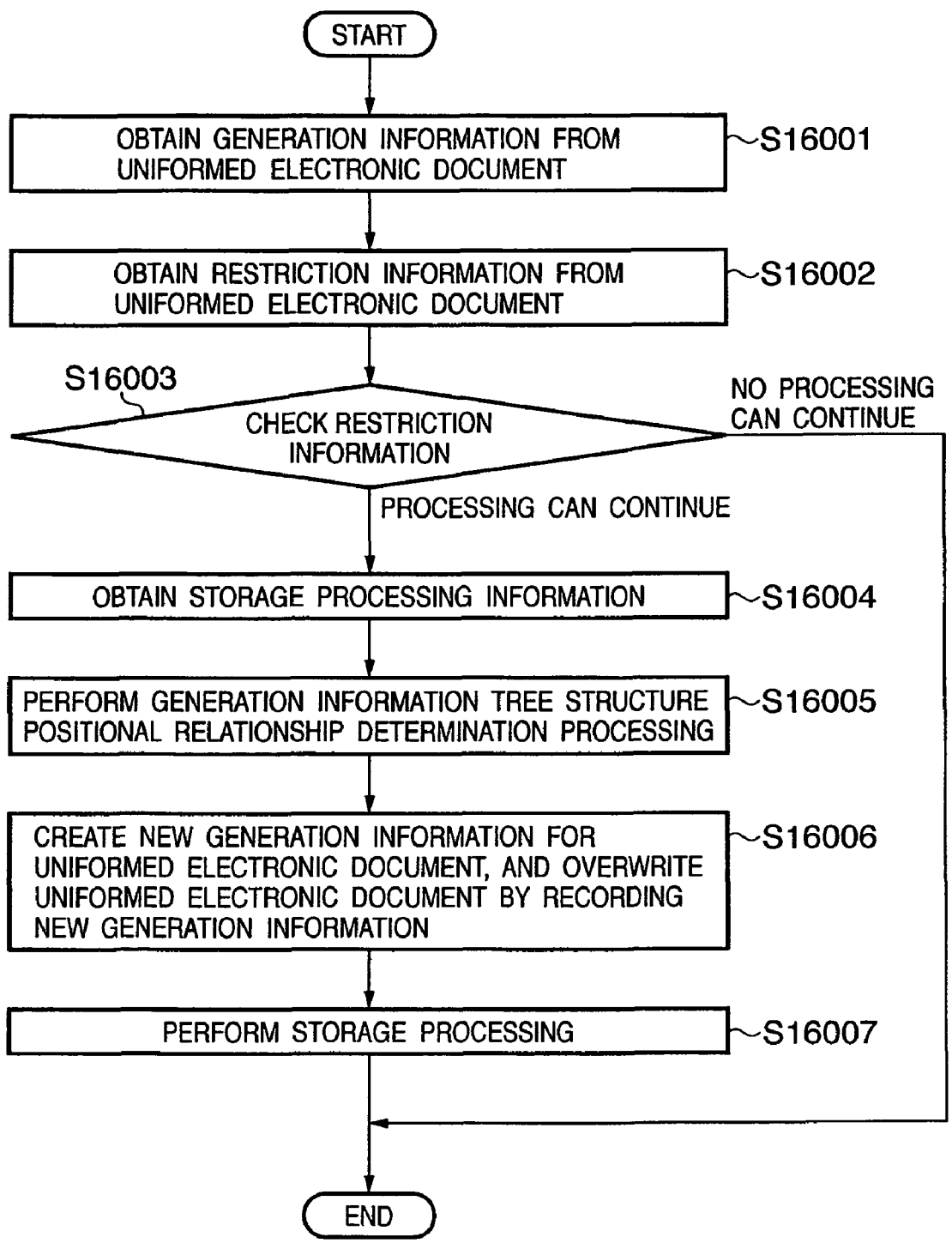
FIG. 16 is a flowchart corresponding to an example of storage processing according to the embodiment of the present invention.

Storage processing in steps S3016 and S3017 will be described in detail mainly with reference to FIGS. 8, 10, and 16. FIG. 8 is a block diagram showing a module configuration in the storage processing unit 1050. FIG. 16 is a flowchart showing an example of storage processing.

In FIG. 8, reference numeral 8001 denotes a storage processing control unit which controls the whole processing in the storage processing unit 1050. Reference numeral 8002 denotes a generation information input/output processing unit for a uniformed electronic document in storage. The generation information input/output processing unit 8002 performs input/output processing for generation information of a uniformed electronic document. A more detailed configuration of the generation information input/output processing unit 8002 is shown in FIG. 10. Reference numeral 8003 denotes a storage processing restriction determination unit which determines whether storage processing is restricted on the basis of restriction information. Reference numeral 8004 denotes a storage processing information obtaining unit which obtains storage processing information on storage processing to be executed by the storage processing control unit 8001. Reference numeral 8005 denotes a uniformed electronic document rewrite unit which rewrites a uniformed electronic document.

In step S16001 of FIG. 16, the generation information reading unit 10003 of the generation information input/output processing unit 8002 for a uniformed electronic document in storage obtains generation information from a uniformed electronic document. In step S16002, the restriction information reading unit 10005 obtains restriction information. In step S16003, on the basis of the restriction information, the storage processing restriction determination unit 8003 determines whether storage processing can continue. If the processing cannot continue, it ends; if the processing can continue, the storage processing information obtaining unit 8004 obtains information subjected to storage processing as storage processing information in step S16004. In step S16005, the generation information positional relationship management unit 10002 of the generation information input/output processing unit 8002 for a uniformed electronic document in storage performs generation information tree structure positional relationship determination processing, and determines the position where the storage processing information is added to existing generation information for the uniformed electronic document. At this time, a position is determined, where the generation relationship in which the current document (uniformed electronic document after storage) is a descendant of the document before storage is represented by a positional relationship in the tree structure for generation information held by the original uniformed electronic document.

In step S16006, on the basis of the determined generation information tree structure positional relationship, the generation information recording unit 10004 of the generation information input/output processing unit 8002 for a uniformed electronic document in storage overwrites the uniformed electronic document by recording new generation information prepared by adding the storage processing information to the existing generation information for the uniformed electronic document. In step S16007, storage processing for the uniformed electronic document is done.

By the above processing, the storage processing information in storage processing can be contained in the generation information of the uniformed electronic document.

Figure 9:
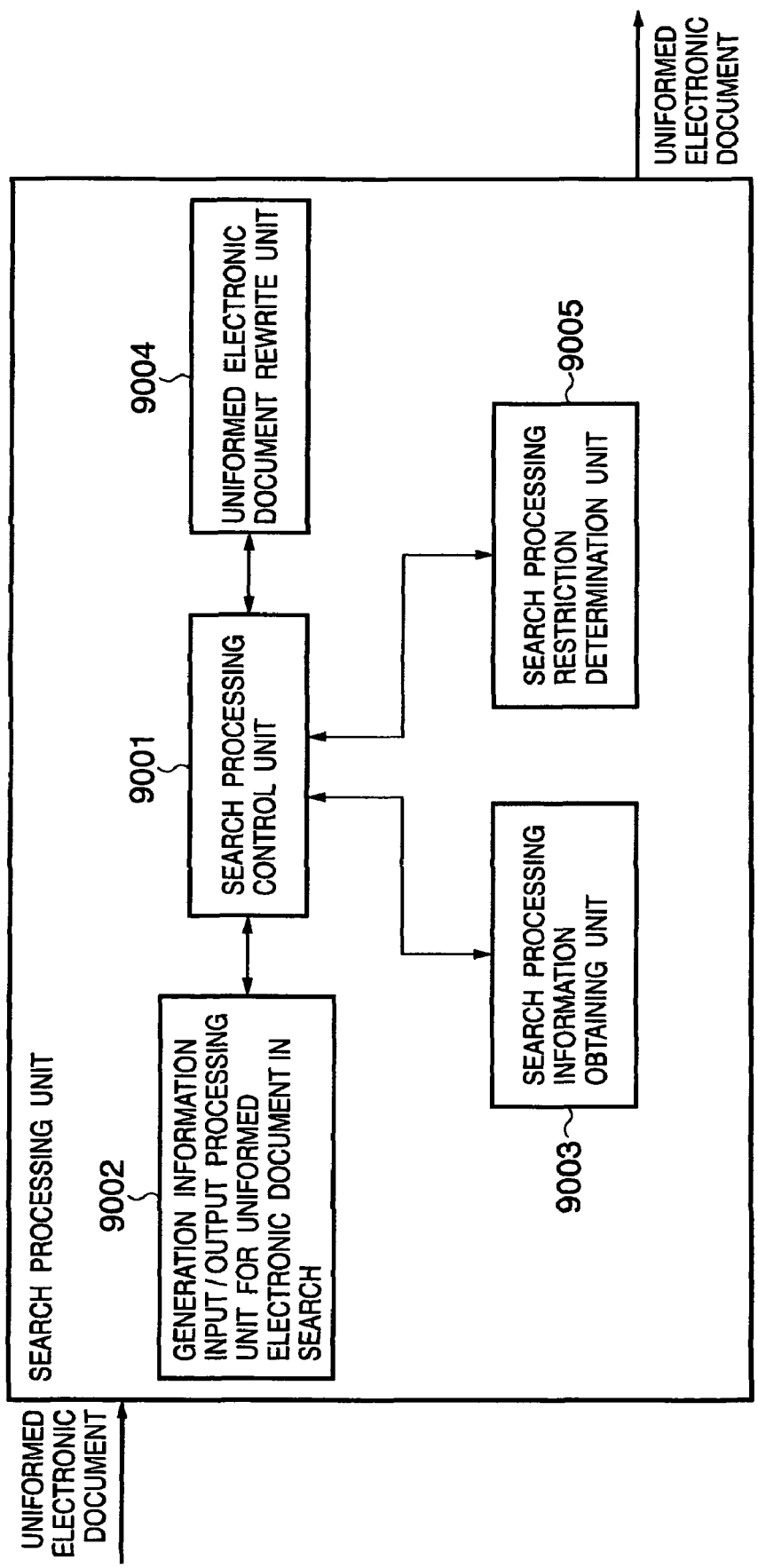
FIG. 9 is a block diagram corresponding to an example of a module configuration in a search processing unit according to the embodiment of the present invention.
Figure 17:
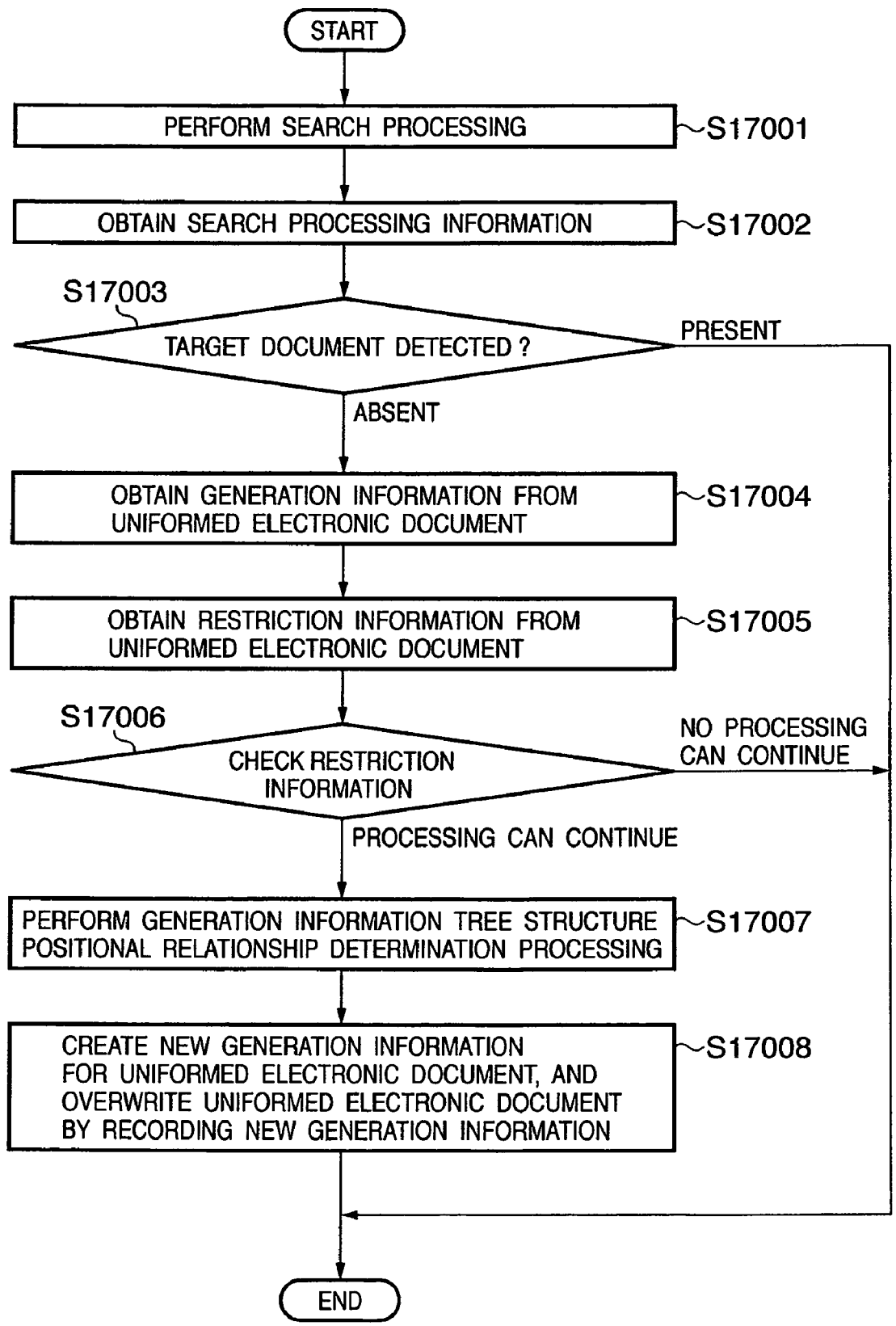
FIG. 17 is a flowchart corresponding to an example of search processing according to the embodiment of the present invention.

Search processing in steps S3018 and S3019 will be described in detail mainly with reference to FIGS. 9, 10, and 17. FIG. 9 is a block diagram showing a module configuration in the search processing unit 1060. FIG. 17 is a flowchart showing an example of search processing.

In FIG. 9, reference numeral 9001 denotes a search processing control unit which controls the whole processing in the search processing unit 1060. Reference numeral 9002 denotes a generation information input/output processing unit for a uniformed electronic document in search. The generation information input/output processing unit 9002 performs input/output processing for generation information of a uniformed electronic document detected by search processing. A more detailed configuration of the generation information input/output processing unit 9002 is shown in FIG. 10. Reference numeral 9005 denotes a search processing restriction determination unit which determines whether search processing is restricted on the basis of restriction information. Reference numeral 9003 denotes a search processing information obtaining unit which obtains search processing information on search processing to be executed by the search processing control unit 9001. Reference numeral 9004 denotes a uniformed electronic document rewrite unit which rewrites a uniformed electronic document.

In step S17001 of FIG. 17, a keyword input and option setting input are accepted to execute search processing. In step S17002, the search processing information obtaining unit 9003 obtains search processing information. In step S17003, it is determined whether a document corresponding to the keyword and the like is detected. If no corresponding document is detected, the processing ends; if the corresponding document is detected, the flow shifts to step S17004. The generation information reading unit 10003 of the generation information input/output processing unit 9002 for a uniformed electronic document in search obtains generation information from the detected uniformed electronic document. In step S17005, the restriction information reading unit 10005 obtains restriction information.

In step S17006, on the basis of the restriction information, the search processing restriction determination unit 9005 determines whether the processing can continue. If the processing -cannot continue, it ends. If the processing can continue, in step S17007, the relationship management unit 10002 of the generation information input/output processing unit 9002 for a uniformed electronic document in search performs generation information tree structure positional relationship determination processing, and determines the position where the search processing information is added to existing generation information for the uniformed electronic document. At this time, a position is determined, where the generation relationship in which the current document (uniformed electronic document after search) is a descendant of the document before search is represented by a positional relationship in the tree structure for generation information held by the original uniformed electronic document.

In step S17008, on the basis of the determined generation information tree structure positional relationship, the generation information recording unit 10004 of the generation information input/output processing unit 9002 for a uniformed electronic document in search overwrites the uniformed electronic document by recording new generation information prepared by adding the search processing information to the existing generation information for the uniformed electronic document.

By the above processing, the search processing information in search processing can be contained in the generation information of the uniformed electronic document.

The structure of generation information, and a change of the generation information before and after predetermined processing is done will be described in detail with reference to FIGS. 23A and 23B. FIGS. 23A and 23B shows newly created uniformed electronic document A (23001), its generation information (23005), paper document B (23002) which is output as a paper document by printing uniformed electronic document A (23001), generation information (23006) of paper document B (23002), paper document C1 (23004) which is output by electrophotographically copying paper document B (23002), and generation information (23008) of paper document C1 (23004), paper document B (23003) whose generation information is changed by electrophotographic copying, and generation information (23007) of paper document B (23003).

In FIGS. 23A and 23B, the contents of each generation information are expressed in the XML format. The contents of generation information are managed by tags <generation information generation ID="e0001"> and </generation information> representing generation information. The type of generation ID includes "exxxx", "pxxxx", "cxxxx", "sxxxx", "stxxxx", and "sexxxx". The type "exxxx" is assigned to a uniformed electronic document which is newly created or edited; "pxxxx", to a paper document created by print processing; "cxxxx", to a paper document created by electrophotographic copy processing; "sxxxx", to a uniformed electronic document created by scanning; "stxxxx", to a stored uniformed electronic document; and "sexxxx", to a uniformed electronic document searched for by search processing. The "xxxx" part is a numerical part, a smaller figure is assigned to a younger generation, and the figure is incremented by one as the generation progresses. Hence, the generation ID="e0001" represents that a uniformed electronic document is a newly created document.

Information on the number of generations in generation information is described. In FIGS. 23A and 23B, the number of copy generations=an electrophotographic copy count, the number of scan generations=a scan count, the number of print generations=a print count, the number of document cycle generations=a count at which an electronic document is output as a paper document once and then formed into a uniformed electronic document again, the number of storage generations=a storage count, and the number of edit generations=an edit count are described following a character "Info". These numbers of generations are incremented by one every time the corresponding generations are updated. For example, the uniformed electronic document A 23001 is a newly created document, and all the numbers of generations are "0". When the uniformed electronic document A 23001 is printed by a printer, the number of print generations in the generation information 23005 of the created paper document 23002 is updated to 1.

Restriction information is managed by tags <Encrypted_data> and </Encrypted_data>. The managed restriction information is attained by encrypting various types of set restriction information in restriction information setting processing in step S11002 when an electronic document is newly created. When various types of restriction information are checked, the restriction information is decrypted, and whether processing can continue is determined by various processing restriction determination units.

Various types of processing information are managed by <edit id="e0001" . . . origin_URL="xxxx" . . . />. In this case, "edit id" corresponds to the generation ID, and an ID corresponding to the contents of executed processing is assigned. Together with processing information, the location of an original electronic document is held as a URL in the form of "origin_URL='xxxxx'".

When new processing is done using an existing document or the like and generation information is created, the generation information is described following processing information which has already been written. For example, in FIG.

23A, when paper document B (23002) is created by print processing for uniformed electronic document A (23001), the generation information 23006 is created in an IC tag attached to the paper document B. Print processing information is added to the generation information 23006 at a position representing a positional relationship in the tree structure in which the current document (paper document B) is a descendant of the document (uniformed electronic document A) before printing. That is, print processing information (<print id="p0001" . . . /> is recorded following new document creation processing information (<edit id="e0001" . . . origin_URL="xxxxx" . . . />).

At this time, the contents of the generation information 23005 of uniformed electronic document A (23001) are also updated. Update of the contents of processing information in the generation information 23005 will be explained in the description of subsequent copy processing. At the same time, the numbers of various generations (e.g., the number of copy generations=an electrophotographic copy count, and the number of scan generations=a scan count) are also held as accessory information in the generation information.

When paper document B (23002) is copied by electrophotographic copy processing, paper document C1 (23004) is created. At this time, an IC tag attached to paper document C1 stores newly created generation information 23008. In the generation information 23008, copy processing information is added at a position representing a positional relationship in the tree structure in which the current document (paper document C1) is a descendant of the document (paper document B) before copying. That is, copy processing information (<copy id="c0001" . . . /> is recorded following print processing information (<print id="p0001" . . . />). At this time, the number of copy generations is incremented by one, and the number of copy generations="1".

At the same time, the generation information 23006 of paper document B (23002) is also updated into generation information 23007. In the generation information 23007, copy processing information is added at a position where the generation relationship in which a descendant is added is represented by a positional relationship in the tree structure. That is, copy processing information (<copy id= "c0001" . . . /> is recorded within the original print processing information (<print id="p0001" . . . />).

FIGS. 23A and 23B show a case wherein uniformed electronic document A is created, and then print processing and copy processing are executed. In another processing, for example, scan processing, the number of scan generations in generation information is updated, the number of scan generations="1", and scan processing information <scan id=s0001 . . . > is added. In storage processing, the number of storage generations is updated, the number of storage generations ="1", and storage processing information <store id=se0001 . . . > is added. When search processing is done, the number of generations is not especially updated, and search processing information <search id=se0001 . . . > is added. In edit processing, the number of edit generations is updated, and the number of edit generations="R ". Note that the number of edit generations is set to "1" when a new document is created. Moreover, edit processing information <edit id=e0001 . . . > is added.

As described above, according to the first embodiment, information representing the contents of processing executed for document data can be attached to the document data created by an application, and can be managed as generation information. Along with the transition of the document lifecycle from an electronic document to a paper document, from a paper document to an electronic document, from a paper document to a paper document, and from an electronic document to an electronic document, generation information can be kept accumulated in each document itself to allow management and control based on the generation information held by the document itself.

Hence, information on how many times a document was scanned, printed, or copied until the current document is obtained, or how many copies/printouts of the document were made, and information on by whom and when a target document was accessed can be kept, accumulated, and managed in each document itself from an electronic document to a paper document, and from a paper document to an electronic document.

According to an invention corresponding to the first embodiment, even if the document lifecycle changes, a user who created an original can be kept known, and the spread of information of contents can be managed.

[Second Embodiment]

In the first embodiment, information representing the contents of processing executed for document data is attached to the document data created by an application, and is managed as generation information. The second embodiment will describe a case wherein processing is controlled using generation information attached to document data.

FIG. 22 is a schematic view showing an example of an input window used when a restriction information setting unit 4003 accepts a generation restriction setting input in step S11003 of FIG. 11. FIG. 22 shows an example of a GUI for setting the number of generations ("up to a predetermined generation" or "after a predetermined generation") to which electrophotographic copying, scanning, printing, and the like are permitted/inhibited.

In the generation management menu window of FIG. 22, "the number of copy-inhibited generations" and "the number of scan-inhibited generations" can be set. As for copying, electrophotographic copying by the third and subsequent generations is inhibited (in other words, generations up to the second generation can perform copying by electrophotographic copying). As for scanning, scanning by generations after the first generations is inhibited (in other words, copying by scanning is inhibited for all generations).

Restriction information set in the window shown in FIG. 22 is encrypted and held as <Encrypted_data>o03w3kt . . . fkae3</Encrypted_data> in generation information 23005 of FIG. 23A when a new document is created. When various types of restriction information are checked, the restriction information is decrypted, and whether processing can continue is determined by various processing restriction determination units (4004, 5007, 6007, 7007, 8003, and 9005) (steps S12003, S13003, S14003, S15003, S16003, and S17006).

Update of the number of generations will be explained with reference to FIGS. 23A to 25. In FIGS. 23A and 23B, when uniformed electronic document A (23001) is printed, paper document B (23002) is output. The number of print generations in generation information 23006 of paper document B (23002) changes to "1", and the numbers of copy and scan generations are kept at "0". Then, paper document B (23002) is electrophotographically copied into paper document Cl (23004). The number of copy generations in generation information (23008) of paper document C1 (23004) changes to "1". Further, when paper document C1 (23004) is electrophotographically copied into paper document C2 (24001), as shown in FIG. 24B, the number of copy generations in generation information 24002 of paper document C2 (24001) is updated to "2". When paper document C2 (24001) is electrophotographically copied, as shown in FIG. 25, the number of copy generations in copy destination paper document C3 (25001) changes to "3". Since "the number of copy-inhibited generations"="3" is set in advance, copy processing using paper document C2 as a copy source paper document is inhibited.

More specifically, access right determination based on the number of generations is executed as one of restriction information checks (step S14003) by the copy processing restriction determination unit (6007). The current number of copy generations is "2", and copy processing is executed to update the number of copy generations to "3". It is determined that copy processing "cannot continue". As a result, copy processing using paper document C2 as a copy source paper document as shown in FIG. 25 is not executed, and no paper document C3 is output.

Also when image data is input by scanning, processing is restricted on the basis of "the number of scan-inhibited generations" set in FIG. 22, similar to electrophotographic copying. For example, when paper document B (23002) in FIG. 23A is to be input from the scanner, generation information 23006 is loaded from an IC tag attached to paper document B to decrypt restriction information (steps S15001 and S15002). For the scanner, the number of scan-inhibited generations=1 is set. Access right determination based on the number of generations is executed as one of restriction information checks (step S15003) by the scan processing restriction determination unit 7007 (step S15003). The current number of scan generations is "0", and copy processing is executed to update the number of scan generations to "1". It is determined that copy processing "cannot continue". Thus, input of image data by a scanner is inhibited, and no image data can be obtained.

Restriction on electrophotographic copying and scanning has been described. Restriction based on the number of generations can be similarly set for another processing. Whether processing can continue can be determined and controlled on the basis of whether the number of generations reaches the set count.

According to the second embodiment, the count of processing performed for a document can be set when an electronic document is newly created. Restriction based on the number of generations in the document lifecycle (e.g., up to which generation is electrophotographic copying or scanning & printing for a given document permitted?) can be easily set.

[Third Embodiment]

In the second embodiment, whether to continue processing such as copying or scanning is restricted on the basis of the number of generations. In the third embodiment, a period restriction can be set to control continuation of processing on the basis of the set period restriction.

In the generation management menu window shown in FIG. 22, the period of the document cycle can be restricted, and whether to continue/interrupt processing can also be set. For example, a "copy inhibition period" setting field is provided in FIG. 22, and setting of inhibiting electrophotographic copying upon the lapse of a predetermined period can be made. In the setting example of FIG. 22, it is set to inhibit electrophotographic copying till Dec. 31, 2010 (in other words, it is set to permit electrophotographic copying after Jan. 1, 2011). This information is also encrypted and held as part of restriction information, i.e., as <Encrypted_data>oO3w3kt . . . fkae3</Encrypted_data> in generation information 23005 when a new document is created.

A case wherein whether to continue copy processing is controlled by the above setting will be explained with reference to FIGS. 26A and 26B. FIGS. 26A and 26B are schematic view showing an example of management on the basis of the generation management expiration date according to the third embodiment.

In FIG. 26A, a given uniformed electronic document is newly created on "2001.1.1" (26009), and the document is printed out once as paper document B (26001). Generation information 26002 of paper document B (26001) holds the number of print generations "1", and both the number of scan generations and that of copy generations="0". In restriction information which is encrypted and attached in the above-described manner, "till 2010.12.31" is set as the copy inhibition period.

When electrophotographic copying is to be performed using paper document B (26001) on "2010.12.30" (26010), generation management expiration date determination is executed as one of restriction information checks (step S14003) by a copy processing restriction determination unit (6007) on the basis of the setting "copy inhibition period"="2010.12.31", and it is determined that "no processing can continue". For this reason, copy processing using paper document B (26001) as a copy source paper document is not executed, and no paper document (26003) is output. At this time, generation information (26002) of paper document B (26001) does not change.

When electrophotographic copying is to be performed using paper document B (26001) on "2011.1.1" (26011), generation management expiration date determination is similarly executed. In this case, the preset "copy inhibition period"="till 2010.12.31" has elapsed, and the copy processing restriction determination unit (6007) determines that "processing can continue". Copy processing using paper document B (26001) as a copy source paper document is executed, and paper document C1 (26004) is output. At this time, the contents of generation information of paper document B (26001) are updated (26002 26006).

Only the period restriction in electrophotographic copying has been described above. It is also possible to set the period restriction on another processing such as editing, printing, scanning, storage, or search, and control to restrict continuation of processing until the set period has elapsed.

According to the third embodiment, the period during which execution of predetermined processing for a document is restricted is set when an electronic document is newly created. Execution of the processing can be restricted until the period has elapsed.

[Fourth Embodiment]

The fourth embodiment will describe a case wherein copy processing free from any degradation of the image quality is controlled using the storage location of an original electronic document that is managed in generation information 23005 shown in FIG. 23A.

In the generation management menu window shown in FIG. 22, a setting field "the number of generations which hold the location of original electronic data" exists in addition to the pieces of restriction information which are described in the second and third embodiments. A setting can be accepted through the setting field. This setting field is used to set the number of generations capable of performing electrophotographic copying using an original electronic document in electrophotographic copying.

The setting field is set when a uniformed electronic document is newly created (restriction information setting processing in step S11002). By providing this setting field, generations exceeding the number of generations set in the setting field cannot hold the location of original electronic data.

In FIG. 22, "the number of generations which hold the location of an original electronic document" is set to "1", and generations up to the number of generations="1" can hold the location of the original electronic document. Thus, generations up to the number of generations "1" are permitted to print using the original electronic document in electrophotographic copying. However, generations after the number of generations="2" do not hold any location information of the original electronic document in their generation information, and cannot print using the original electronic document in electrophotographic copying.

Similar to the second and third embodiments, the restriction information is encrypted and held as <Encrypted_data>o03w3kt . . . fkae3</Encrypted_data> in generation information (23005) shown in FIG. 23 when a new document is created. When various types of restriction information are checked, the restriction information is decrypted, and whether processing can continue is determined by various processing restriction determination units.

The flow of electrophotographic copy processing when "the number of generations which hold the location of an original electronic document" is set to "1", as shown in FIG. 22, will be explained.

In FIG. 23A, generation information (23005) of uniformed electronic document A (23001) when a new document is created holds location information of an original electronic document in the URL format of "origin_URL='xxxxx'" in new document creation processing information (<edit id="e0001" . . . origin_URL="xxxxx" . . . />). The result of printing uniformed electronic document A (23001) is paper document B (23002). A case wherein paper document B (23002) is electrophotographically copied to create paper document C1 (23004) will be examined.

At this time, "the number of generations which hold the location of an original electronic document" is set to "1" in advance. For paper document C1 (23004) corresponding to the number of copy generations="1", original electronic document use restriction determination is executed as one of restriction information checks (step S14003) by a copy processing restriction determination unit (6007) in copy processing using paper document B (23002) as a copy source paper document, and it is determined that "processing can continue". The original electronic document can be downloaded from the location "origin_URL 'xxxxx'" and directly printed, and "copying substantially free from degradation" can be achieved.

Figure 24A:
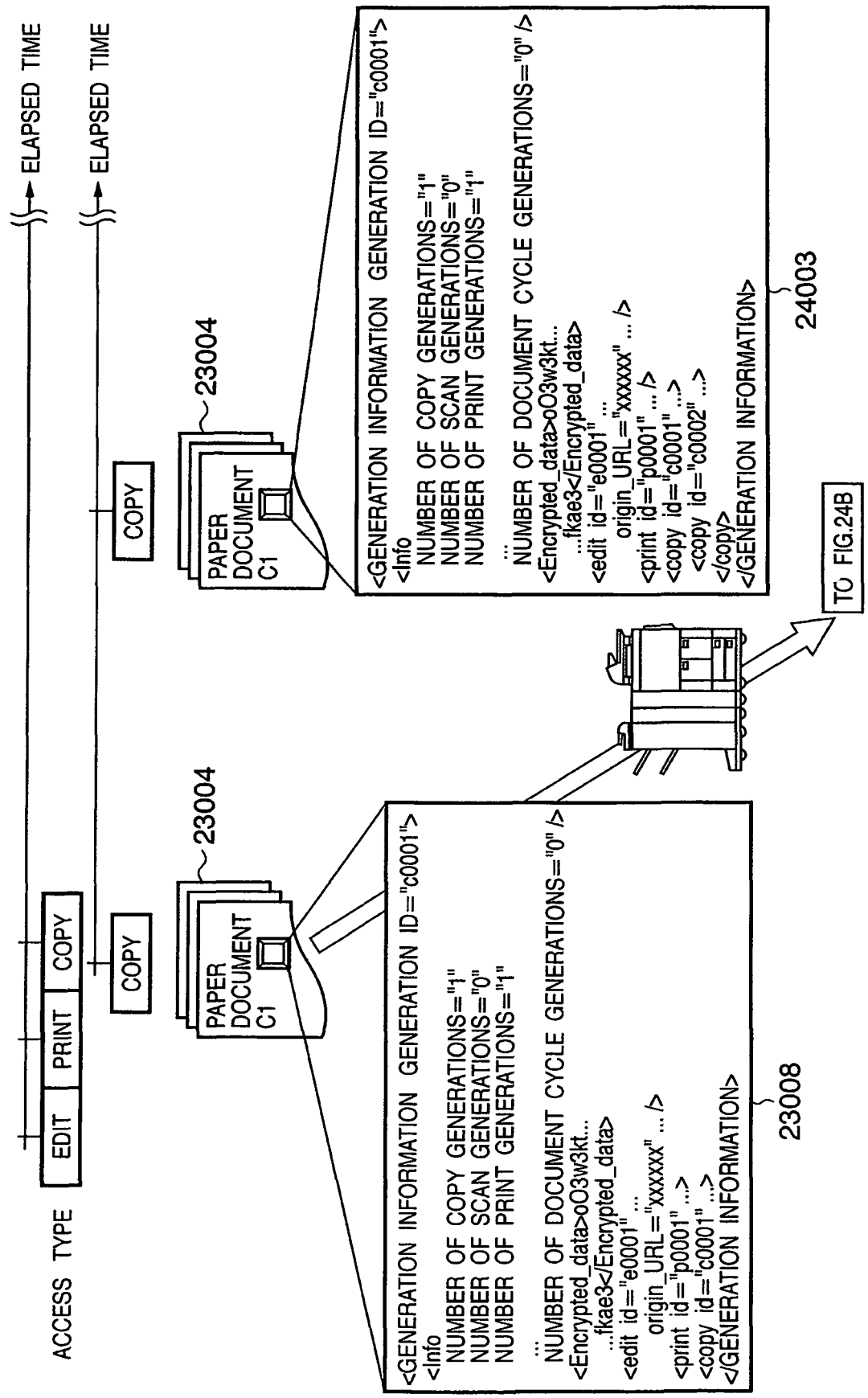
FIGS. 24A and 24B are schematic views corresponding to examples of the structure of generation information in electrophotographic copy processing and a change of the generation information according to the second embodiment of the present invention.
Figure 24B:
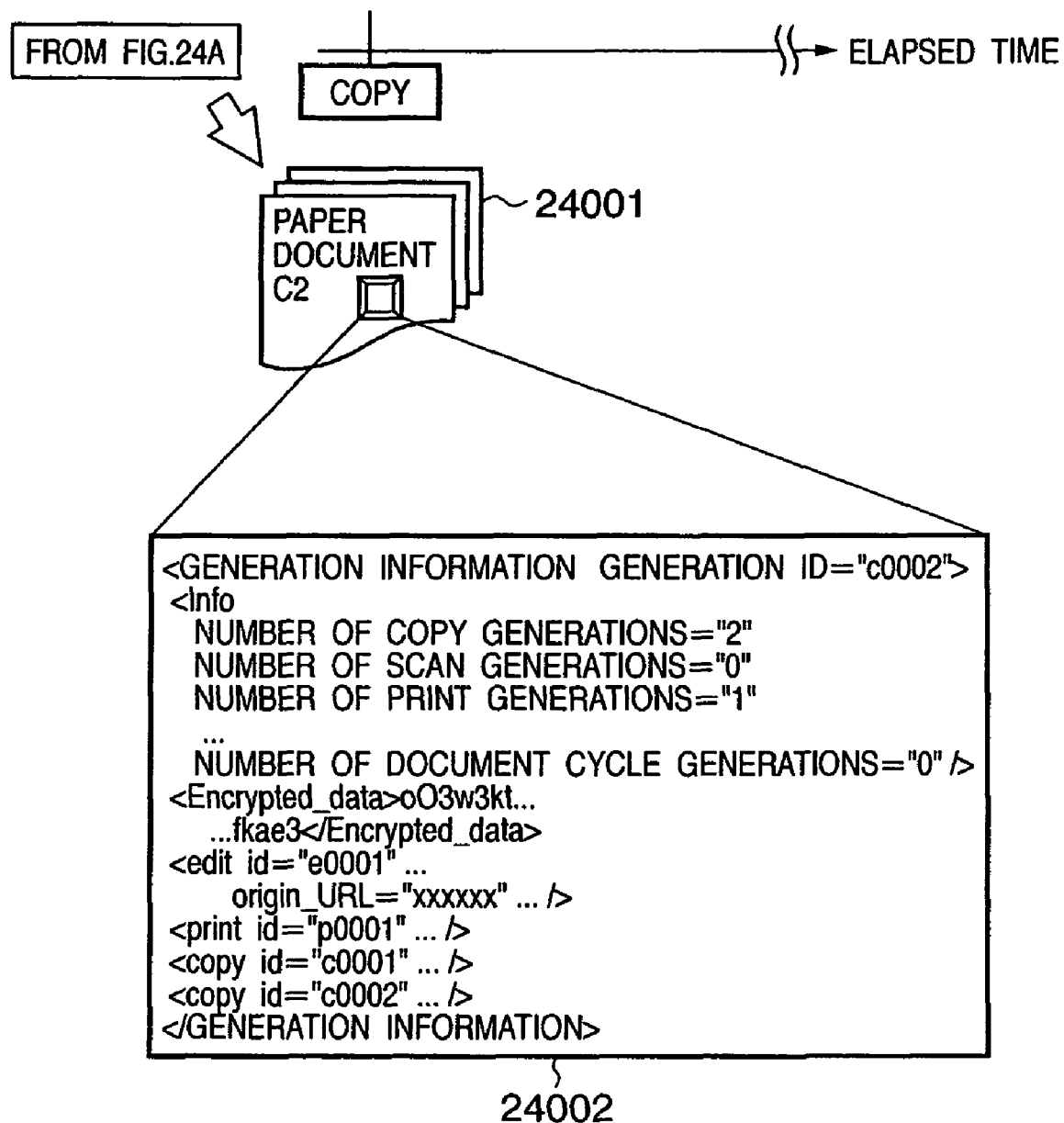
Figure 25:
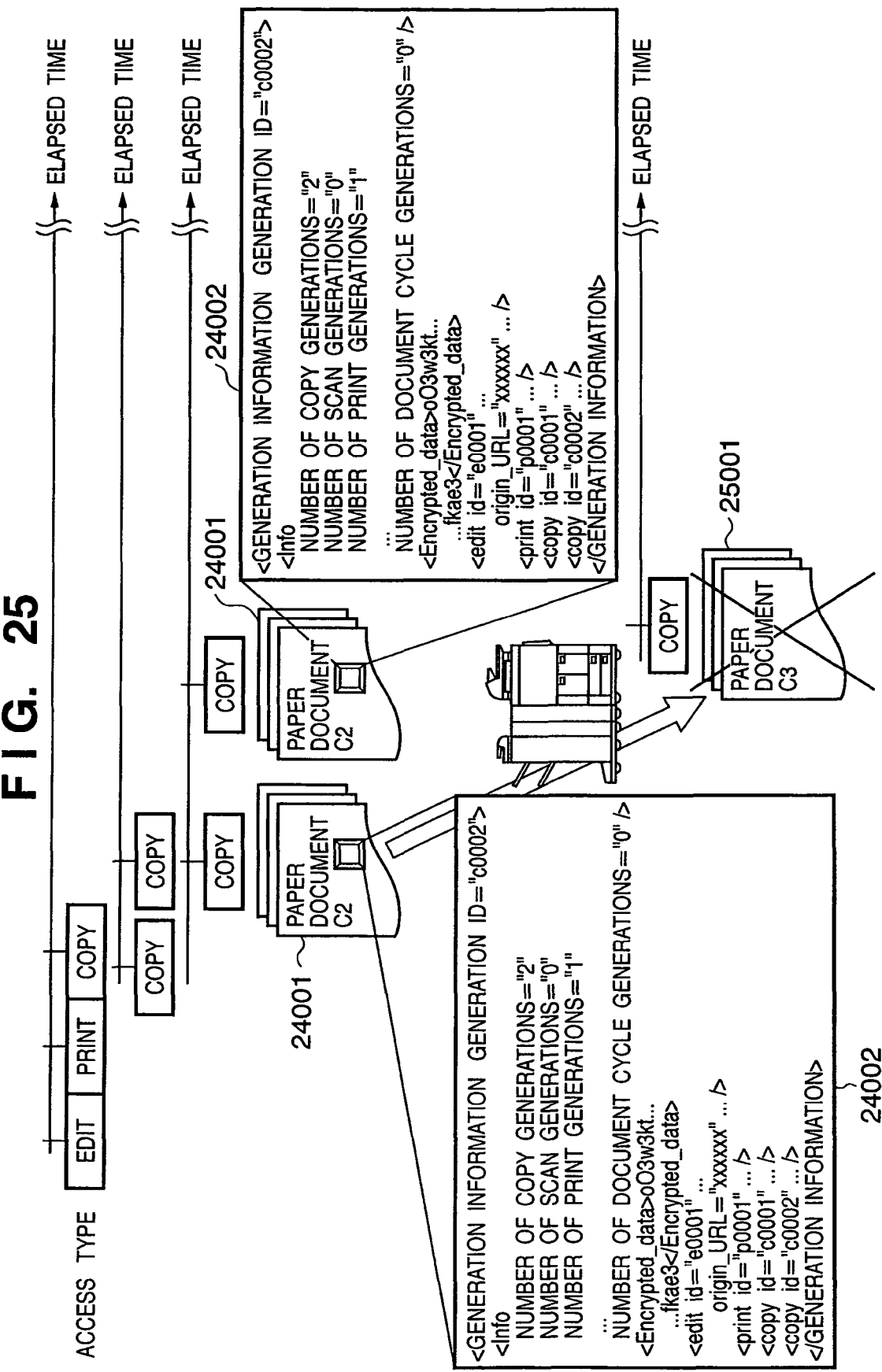
FIG. 25 is a schematic view corresponding to an example of the structure of generation information and a change of the generation information when electrophotographic copy processing is repetitively executed according to the second embodiment of the present invention.

When paper document C2 (24001) is created using paper document C1 (23004) as a copy source, as shown in FIGS. 24A and 24B, the number of copy generations in 5 generation information 24002 becomes "2". When original electronic document use restriction determination is done as one of restriction information checks (step S14003) by the copy processing restriction determination unit (6007) in copy processing, it is 10 determined that "no processing can continue". It is, therefore, restricted to download the original electronic document from the location "origin_URL='xxxxx'" and directly print it. Electrophotographic copy processing directly using paper document C1 (23004) is executed. In this case, no "copying substantially free from degradation" is done.

The flow of processing according to the fourth embodiment will be explained with reference to FIGS. 6, 18, 19, and 14. In step S18001, a generation information input/output processing unit 6005 for the IC tag of a copy source in copying obtains generation information from an IC tag attached to a paper document serving as a copy source via an IC tag data reception unit 6003. In step S18002, restriction information in the generation information is decrypted and obtained.

In step S18003, the copy processing restriction determination unit 6007 determines whether copy processing can continue, on the basis of restriction information (e.g., restriction information such as "the number of copy-inhibited generations" or "copy inhibition period" in FIG. 22) other than the original electronic document use restriction. If the processing cannot continue, it ends; if the processing can continue, the flow shifts to step S18004 to determine, on the basis of restriction information of the original electronic document use restriction, whether the original electronic document can be obtained to execute copy processing.

More specifically, the setting value of "the number of generations which hold the location of original electronic data" that is set in a window as shown in FIG. 22 is compared with the number of generations that is obtained by copy processing to be performed. If the number of generations is equal to or smaller than the setting value, processing can be done.

For example, if the setting value is "2" and the number of generations is "1", processing accompanied with obtainment of the original electronic document is possible. However, if the setting value is "1" and the number of generations is "2", the processing is impossible.

If printing accompanied with obtainment of the original electronic document is possible, the flow shifts to step S18006 to perform undegraded copy processing. If printing accompanied with obtainment of the original electronic document is impossible, the flow shifts to step S18005 to perform normal (degraded) copy processing. In normal (degraded) copy processing (S18005), the same processes as those in steps S14004 to S14009 of FIG. 14 are executed. In undegraded copy processing (S18006), processing as shown in FIG. 19 is executed.

Figure 19:
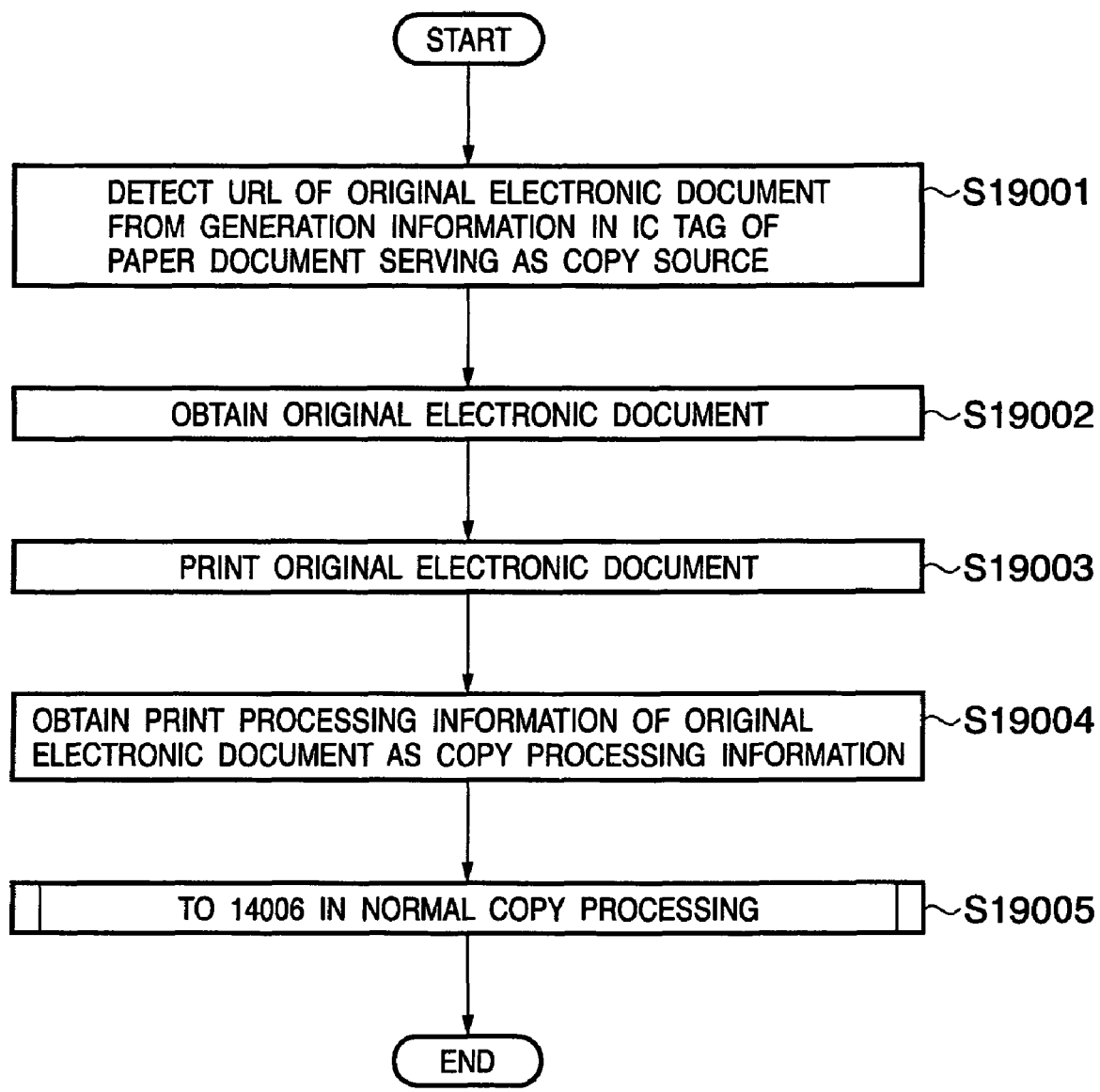
FIG. 19 is a flowchart corresponding to an example of undegraded copy processing according to the fourth embodiment of the present invention.

FIG. 19 is a flowchart showing an example of undegraded copy processing according to the fourth embodiment. In step S19001 of FIG. 19, a URL representing the location of an original electronic document is extracted from generation information obtained from the IC tag of a paper document serving as a copy source. In step S19002, the original electronic document is downloaded and obtained using the extracted URL. In step S19003, print processing is executed using the downloaded original electronic document. In step S19004, print processing information of the original electronic document is obtained as copy processing information. In step S19005, processes corresponding to steps S14006 to S14009 in normal (degraded) copy processing are executed. Then, the processing ends.

After normal (degraded) copy processing (S18005) or undegraded copy processing (Sl8006) ends, copy processing ends.

In the above example, an original electronic document is used when a paper document is copied. In another processing, for example, when image data of a paper document is input by a scanner, a uniformed electronic document can be created using not the obtained image data but the original electronic document. Hence, the setting content in "the number of generations which hold the location of original electronic data" can also be applied to creation of- a uniformed electronic document or printing on the basis of Image data input by the scanner.

According to the prior arts, it is difficult to restrict access to an original electronic document on the basis of the "generation" of the document. This is because, if a document in which the location of an original electronic document is written as a digital watermark or barcode on a page is copied electrophotographically, the original electronic document can be accessed even from the copy, and can be printed without any restriction and any degradation of the image quality. To the contrary, according to the fourth embodiment, whether an original electronic document can be utilized in copying or printing can be controlled on the basis of generation information.

[Fifth Embodiment]

In the fourth embodiment, the location of an original electronic document is kept described in generation information even if the original electronic document becomes unavailable. In the fifth embodiment, whether to hold location information is also managed.

The flow of processing according to the fifth embodiment will be explained with reference to FIGS. 18, 20, 21, and 14.

Figure 18:
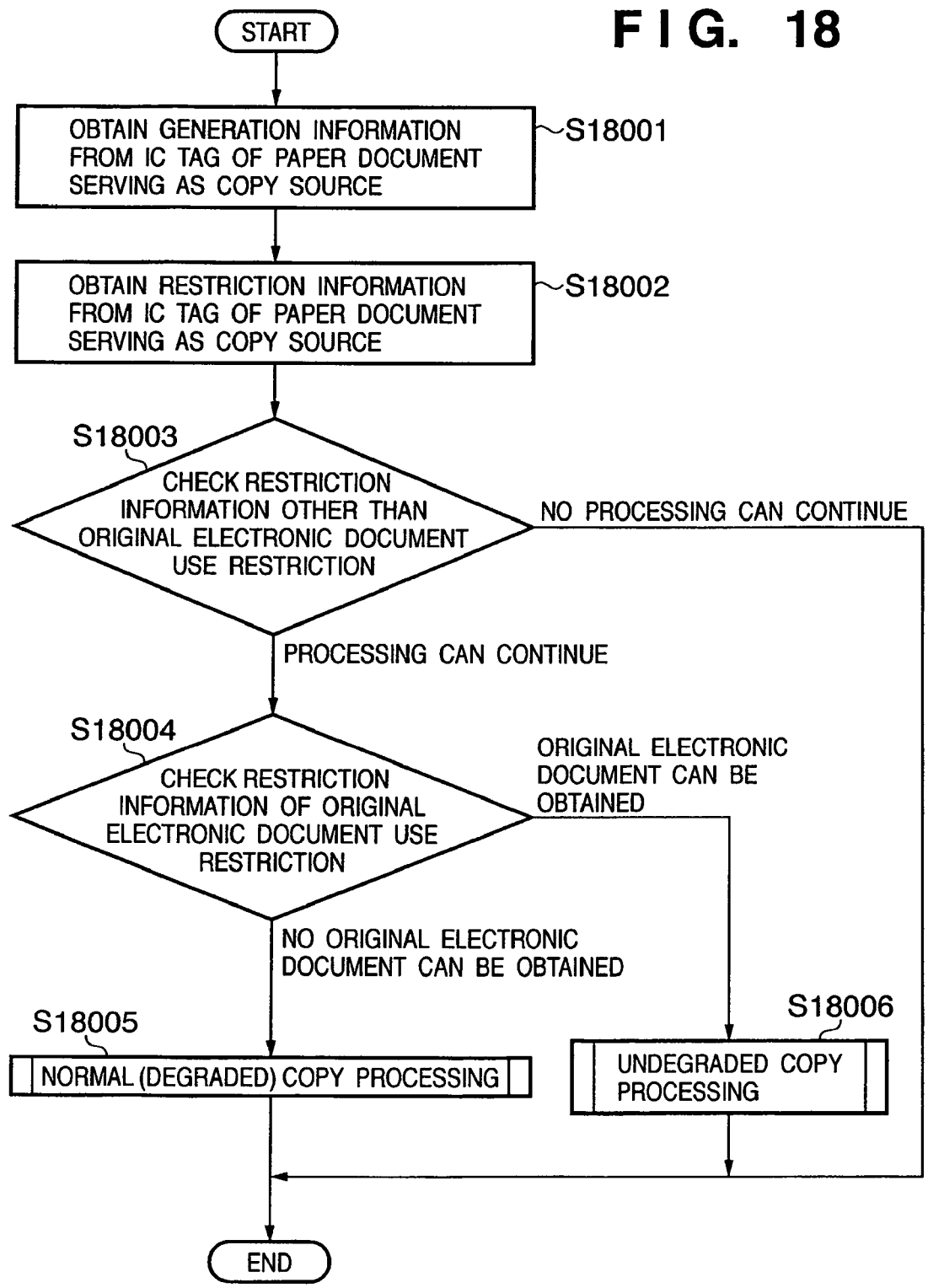
FIG. 18 is a flowchart corresponding to an example in which it is managed to perform copying free from degradation without any restriction according to the fourth embodiment of the present invention.
Figure 20:
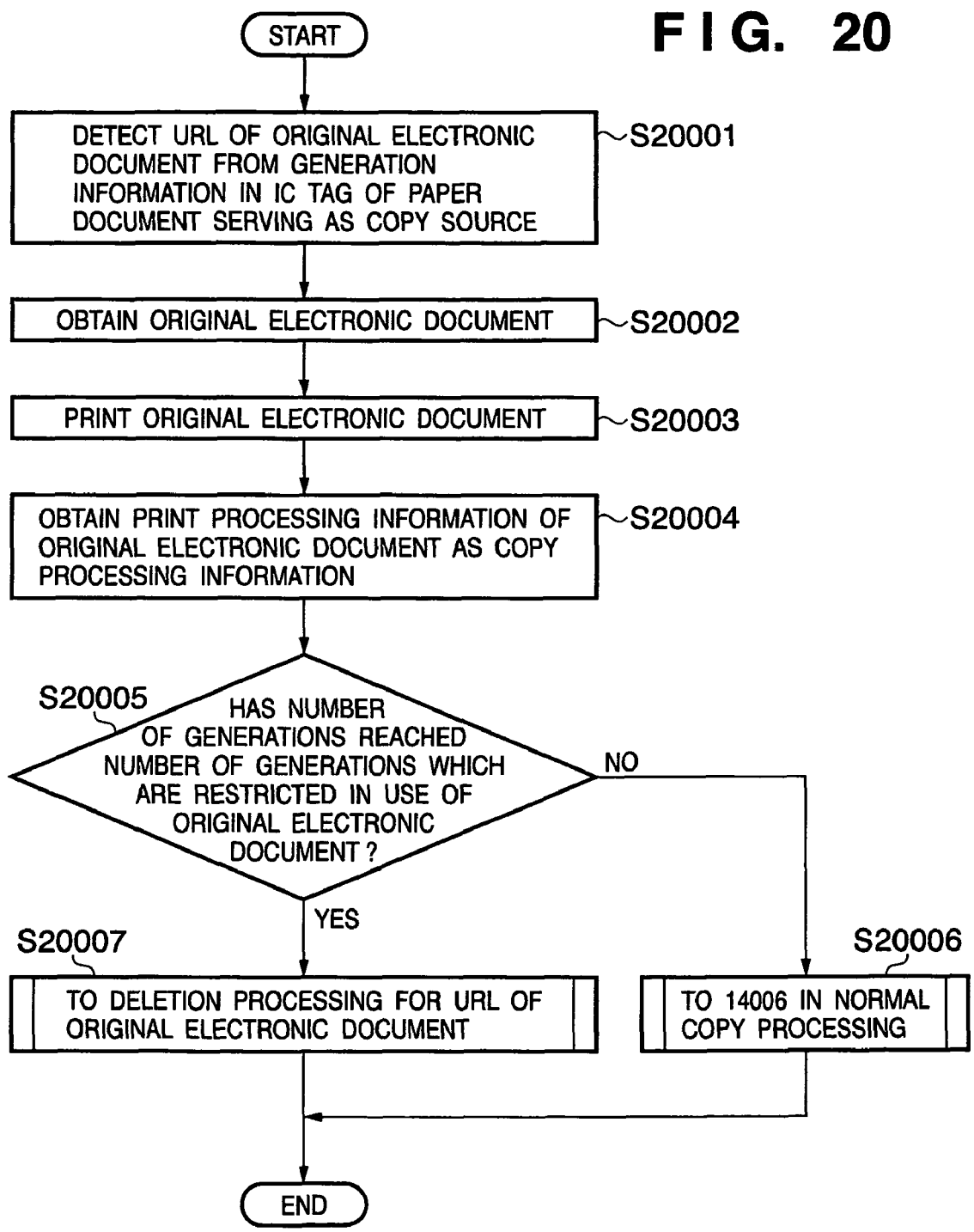
FIG. 20 is a flowchart corresponding to an example of undegraded copy processing when it is managed whether to hold location information of an original electronic document according to the fifth embodiment of the present invention.

In FIG. 18, processing up to step S18005 is the same as the flow described in the fourth embodiment. If undegraded copy processing is performed in step S18006, processing shown in FIG. 20 is executed. FIG. 20 is a flowchart corresponding to an example of undegraded copy processing according to the fifth embodiment.

In step S20001 of FIG. 20, a URL representing the location of an original electronic document is extracted from generation information obtained from the IC tag of a paper document serving as a copy source. In step S20002, the original electronic document is downloaded and obtained using the extracted URL. In step S20003, the obtained original electronic document is printed. In step S20004, print processing information of the original electronic document is In step S20005, it is determined whether the number of generations has reached the number of generations which are restricted in the use of the original electronic document if it is determined that the number of generations does not reach the number of use-restricted generations, the same processing as normal (degraded) copy processing corresponding to steps S14006 to S14009 is executed in step S20006, and then, the processing ends. If it is determined that the number of generations has reached the number of use-restricted generations, deletion processing for location information of the original electronic document is performed in step S20007 in order to more reliably inhibit, in subsequent copy processing, copying substantially free from degradation that is implemented by obtaining and printing the original electronic document.

Figure 21:
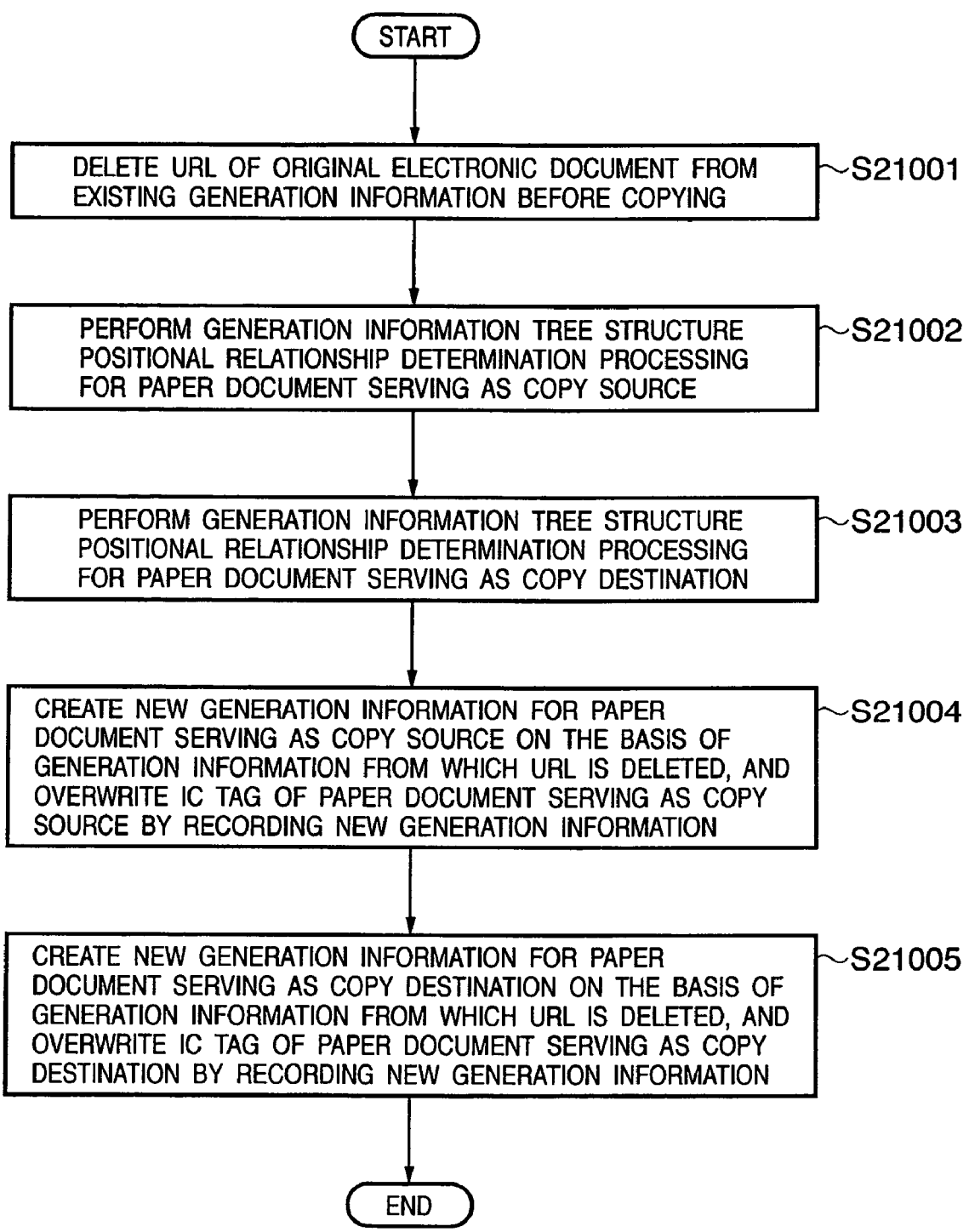
FIG. 21 is a flowchart corresponding to an example of generation information update processing accompanied with deletion processing of location information of an original electronic document according to the fifth embodiment of the present invention.

FIG. 21 is a flowchart showing the flow of generation information update processing accompanied with deletion processing of location information of an original electronic document in step S20007 of FIG. 20. In step S21001 of FIG. 21, the URL of an original electronic document is deleted from existing generation information before copying. In step S21002, a generation information positional relationship management unit 10002 of a generation information input/output processing unit 6005 for the IC tag of a copy source in copying executes generation information tree structure positional relationship determination processing for a paper document serving as a copy source, and determines the position where copy processing information is added to the existing generation information for the paper document serving as a copy source. At this time, a position where the generation relationship in which a descendant is added is represented by a positional relationship in the tree structure for generation information held by the original paper document serving as a copy source is determined as the addition position on the paper document serving as a copy source.

In step S21003, the generation information positional relationship management unit 10002 of a generation information input/output processing unit 6006 for the IC tag of a copy destination in copying executes generation information tree structure positional relationship determination processing for a paper document serving as a copy destination, and determines the position where copy processing information is added to the existing generation information for the paper document serving as a copy destination. At this time, a position where the generation relationship in which the current document (paper document serving as a copy destination) is a descendant of the document before copying is represented by a positional relationship in the tree structure for generation information held by the original paper document serving as a copy source is determined as the addition position on the paper document serving as a copy destination.

In step S21004, on the basis of each determined generation information tree structure positional relationship, a generation information recording unit 10004 of the generation information input/output processing unit 6005 for the IC tag of a copy source in copying overwrites the IC tag of the paper document serving as a copy source via an IC tag data transmission unit 6004 by recording new generation information prepared by adding, for the paper document serving as a copy source, the copy processing information to generation information attained by deleting the URL of the original electronic document from the existing generation information before copying. In step S21005, the generation information recording unit 10004 of the generation information input/output processing unit 6006 for the IC tag of a copy destination in copying newly records, in the IC tag of the paper document serving as a copy destination via the IC tag data transmission unit 6004, new generation information prepared by adding, for the paper document serving as a copy source, the copy processing information to generation information attained by deleting the URL of the original electronic document from the existing generation information before copying.

Note that an invention corresponding to the fifth embodiment can be applied to creation of a uniformed electronic document using an original electronic document when image data of a paper document is input by a scanner, similar to the fourth embodiment.

According to the fifth embodiment, the number of generations is set by original electronic document use restriction setting, and is used in electrophotographic copying in order to inhibit generations exceeding predetermined generations from performing copying free from degradation that is implemented by printing the original electronic document. By using the number of generations, not only determination of original electronic document use restriction, but also management of whether to hold location information of an original electronic document can be achieved.

[Other Embodiment]

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium (or recording medium) which records software program codes to implement the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) or the like running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-080589 filed Mar. 18, 2005, which is hereby incorporated by reference herein in its entirety.

What is claimed is:

1. A document management system comprising:
    an electronic document editing unit configured to perform edit processing for an electronic document;
    a processing information obtaining unit configured to obtain edit processing information based on the edit processing performed by said electronic document editing unit;
    a management unit configured to manage the edited electronic document in association with generation information of the edited electronic document, the generation information including at least the edit processing information obtained by said processing information obtaining unit;
    a print processing unit configured to print the edited electronic document to a printed paper document, and to record the generation information in the printed paper document, wherein the management unit is further configured to update the generation information of the edited electronic document corresponding to the printed paper document by adding print processing information to the generation information, the print processing information being obtained from the print processing unit in response to the print processing by the print processing unit, and wherein the print processing unit records the updated generation information in the printed paper document that is outputted from the print processing unit;
    a copy processing unit configured to copy the printed paper document printed by the print processing unit into a copy destination paper document and to output the resulted copy destination paper document, wherein said copy processing unit is further configured to update the generation information recorded in the printed paper document by adding copy processing information obtained from said copy processing unit, and to record the updated generation information in the resulted copy destination paper document to be outputted from said copy processing unit;
    a scan processing unit configured to scan a paper document to obtain a scan image, the paper document being the printed paper document printed by said print processing unit or the copy destination paper document outputted by said copy processing unit, and to update the generation information recorded in the scanned paper document by adding scan processing information obtained from said scan processing unit, and to record the updated generation information to the scan image obtained by said scan processing unit; and
    a storage processing unit configured to update the generation information registered by said scan processing unit by adding storing processing information, and to store the scan image obtained by said scan processing unit with the generation information updated by said storage processing unit.

2. The document management system according to claim 1 further comprising:
    a limiting information receiving unit configured to receive an input of limiting information to be included in the generation information managed by the management unit, for limiting processing for the electronic document; and
    an edit determination unit configured to determine whether editing of the electronic document is permitted or not based on the generation information managed by the management unit.

3. The document management system according to claim 1 further comprising:
    a limiting information receiving unit configured to receive an input of limiting information to be included in the generation information managed by the management unit, for limiting processing for the electronic document; and
    a print determination unit configured to determine whether printing of the electronic document is permitted or not based on the generation information managed by the management unit.

4. The document management system according to claim 1 further comprising:
    a limiting information receiving unit configured to receive an input of limiting information to be included in the generation information managed by the management unit, for limiting processing for the electronic document; and
    a scan determination unit configured to determine whether scanning of the electronic document is permitted or not based on the generation information included in the paper document to be scanned.

5. The document management system according to claim 1 further comprising:
    a limiting information receiving unit configured to receive an input of limiting information to be included in the generation information managed by the management unit, for limiting processing for the electronic document; and
    a copy determination unit configured to determine whether copying of the electronic document is permitted or not based on the generation information included in the paper document as a copy source.

6. The document management system according to claim 1, wherein the edit processing information includes at least any one of a name of user who edited the document, an editing date and time, a location of an editing device and an editing method.

7. The document management system according to claim 1, wherein the print processing information includes at least any one of a name of user who printed the document, a printing date and time, a location of printing device and a printing method.

8. The document management system according to claim 1, wherein the scan processing information includes at least any one of a name of user who scanned the document, a scanning date and time, a location of scanning device and a scanning method.

9. The document management system according to claim 1, wherein the copy processing information includes at least any one of a name of user who copied the document, a copying date and time, a location of copying device and a copying method.

10. A method for controlling a document management system, comprising:
 performing, by an electronic document editing unit, edit processing for an electronic document;
 obtaining edit processing information based on the edit processing performed by said electronic document editing unit;
 managing the edited electronic document in association with generation information of the edited electronic document, the generation information including at least the obtained edit processing information;
 using a print processing unit to print the edited electronic document to a printed paper document, and to record the generation information in the printed paper document, wherein the generation information of the edited electronic document corresponding to the printed paper document is updated by adding print processing information to the generation information, the print processing information being obtained from the print processing unit in response to the print processing by the print processing unit, and wherein the print processing unit records the updated generation information in the printed paper document that is outputted from the print processing unit;
 using a copy processing unit to copy the printed paper document printed by the print processing unit into a copy destination paper document, to output the resulted copy destination paper document, to update the generation information recorded in the printed paper document by adding copy processing information obtained from said copy processing unit, and to record the updated generation information in the resulted copy destination paper document to be outputted from said copy processing unit;
 using a scan processing unit to scan a paper document to obtain a scan image, the paper document being the printed paper document printed by said print processing unit or the copy destination paper document outputted by said copy processing unit, and to update the generation information recorded in the scanned paper document by adding scan processing information obtained from said scan processing unit, and to record the updated generation information to the scan image obtained by said scan processing unit; and
 using a storage processing unit to update the generation information registered by said scan processing unit by adding storing processing information, and to store the scan image obtained by said scan processing unit with the generation information updated by said storage processing unit.

11. A non-transitory computer readable storage medium retrievably storing a computer program which causes a computer to execute a method for controlling a document management system, the method comprising:
 performing, by an electronic document editing unit, edit processing for an electronic document;
 obtaining edit processing information based on the edit processing performed by said electronic document editing unit;
 managing the edited electronic document in association with generation information of the edited electronic document, the generation information including at least the obtained edit processing information;
 using a print processing unit to print the edited electronic document to a printed paper document, and to record the generation information in the printed paper document, wherein the generation information of the edited electronic document corresponding to the printed paper document is updated by adding print processing information to the generation information, the print processing information being obtained from the print processing unit in response to the print processing by the print processing unit, and wherein the print processing unit records the updated generation information in the printed paper document that is outputted from the print processing unit;
 using a copy processing unit to copy the printed paper document printed by the print processing unit into a copy destination paper document, to output the resulted copy destination paper document, to update the generation information recorded in the printed paper document by adding copy processing information obtained from said copy processing unit, and to record the updated generation information in the resulted copy destination paper document to be outputted from said copy processing unit;
 using a scan processing unit to scan a paper document to obtain a scan image, the paper document being the printed paper document printed by said print processing unit or the copy destination paper document outputted by said copy processing unit, and to update the generation information recorded in the scanned paper document by adding scan processing information obtained from said scan processing unit, and to record the updated generation information to the scan image obtained by said scan processing unit; and
 using a storage processing unit to update the generation information registered by said scan processing unit by adding storing processing information, and to store the scan image obtained by said scan processing unit with the generation information updated by said storage processing unit.

* * * * *